(12) United States Patent
Dawes et al.

(10) Patent No.: US 9,975,802 B2
(45) Date of Patent: May 22, 2018

(54) METHOD FOR MAKING LOW BEND LOSS OPTICAL FIBER PREFORMS

(71) Applicant: Corning Incorporated, Corning, NY (US)

(72) Inventors: Steven Bruce Dawes, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 14/278,437

(22) Filed: May 15, 2014

(65) Prior Publication Data

US 2014/0352361 A1    Dec. 4, 2014

Related U.S. Application Data

(60) Provisional application No. 61/829,616, filed on May 31, 2013.

(51) Int. Cl.

| | | |
|---|---|---|
| *C03B 37/014* | (2006.01) | |
| *C03B 37/012* | (2006.01) | |
| *G02B 6/02* | (2006.01) | |
| *G02B 6/036* | (2006.01) | |
| *G02B 6/028* | (2006.01) | |

(52) U.S. Cl.
CPC ...... *C03B 37/012* (2013.01); *C03B 37/01453* (2013.01); *C03B 2201/12* (2013.01); *C03B 2203/22* (2013.01); *C03B 2203/23* (2013.01); *C03B 2203/26* (2013.01); *G02B 6/02038* (2013.01); *G02B 6/0283* (2013.01); *G02B 6/0365* (2013.01); *G02B 6/03627* (2013.01)

(58) Field of Classification Search
CPC .......................... C03C 21/007; C03B 19/066
See application file for complete search history.

(56) References Cited

U.S. PATENT DOCUMENTS 4,225,330 A * 9/1980 Kakuzen ............... C03B 37/014
65/17.4
4,610,709 A * 9/1986 Kawauchi et al. ............. 65/397
(Continued)

FOREIGN PATENT DOCUMENTS

JP    2007052458    3/2007
WO    2013003003    1/2013
(Continued)

OTHER PUBLICATIONS

Tandon; "Doping of Silica During Sintering"; Journal of Non-Crystalline Solids; 351 (2005) 1466-1472.

*Primary Examiner* — John M Hoffman
(74) *Attorney, Agent, or Firm* — Svetlana Z. Short

(57) ABSTRACT

A method of making an optical fiber preform comprising in order: (i) manufacturing a glass preform with at least one porous layer; (ii) exposing the glass preform with at least one porous layer to a fluorine precursor at temperature below 1295° C. to make a fluorine treated preform, and (iii) exposing the fluorine treated glass preform with at least one porous silica based layer the temperatures above 1400° C. to completely sinter the preform. Preferably, the porous silica based layer of the glass preform exposed to fluorine precursor has average density of at least 0.7 g/cm$^3$ but less than 1.9 g/cm$^3$.

20 Claims, 9 Drawing Sheets

(56) References Cited

U.S. PATENT DOCUMENTS

| | | | | |
|---|---|---|---|---|
| 4,620,861 | A | * | 11/1986 | Berkey .......................... 65/399 |
| 4,627,867 | A | * | 12/1986 | Tanaka ................ C03B 37/0142 |
| | | | | 65/421 |
| 4,629,485 | A | * | 12/1986 | Berkey .......................... 65/398 |
| 4,772,302 | A | * | 9/1988 | Abe ................................ 65/397 |
| 4,822,136 | A | * | 4/1989 | Hicks, Jr. ...................... 385/142 |
| 5,149,349 | A | * | 9/1992 | Berkey et al. .................. 65/403 |
| 5,217,515 | A | | 6/1993 | Guglielmi |
| 5,217,516 | A | * | 6/1993 | Ishiguro et al. ................ 65/397 |
| 5,246,475 | A | * | 9/1993 | Edagawa .......... C03B 37/01413 |
| | | | | 65/17.4 |
| 5,364,428 | A | * | 11/1994 | Kyoto et al. .................... 65/397 |
| 5,656,057 | A | * | 8/1997 | Brown .............. C03B 37/01446 |
| | | | | 65/384 |
| 5,917,109 | A | * | 6/1999 | Berkey .......................... 65/412 |
| 6,263,706 | B1 | | 6/2001 | Deliso et al. |
| 8,200,057 | B2 | | 6/2012 | Han |
| 2002/0073740 | A1 | | 6/2002 | Dawes et al. |
| 2002/0116955 | A1 | * | 8/2002 | Enomoto ............ C03B 37/0142 |
| | | | | 65/415 |
| 2003/0046960 | A1 | * | 3/2003 | Dawes .............. C03B 37/01446 |
| | | | | 65/391 |
| 2004/0172980 | A1 | * | 9/2004 | Hazan et al. ................... 65/397 |
| 2011/0064368 | A1 | | 3/2011 | BookBinder |
| 2011/0132038 | A1 | * | 6/2011 | Dawes et al. ................... 65/408 |
| 2013/0321891 | A1 | | 12/2013 | Ishida et al. |
| 2014/0161406 | A1 | | 6/2014 | Kumano |

FOREIGN PATENT DOCUMENTS

| | | |
|---|---|---|
| WO | 2013021759 | 2/2013 |
| WO | 2013082062 | 6/2013 |
| WO | 2013082217 | 6/2013 |
| WO | 2013082218 | 6/2013 |

* cited by examiner

METHOD FOR MAKING LOW BEND LOSS OPTICAL FIBER PREFORMS

CROSS-REFERENCE TO RELATED APPLICATIONS

This application claims the benefit of priority under 35 U.S.C. § 119 of U.S. Provisional Application Ser. No. 61/829,616 filed on May 31, 2013 the contents of which are relied upon and incorporated herein by reference in their entirety.

FIELD

The present invention relates to a method for manufacturing optical fibers with low bend losses.

BACKGROUND

There is a need for low bend loss optical fibers, particularly for optical fibers utilized in so-called "access" and fiber to the premises (FTTx) optical networks. Low bend loss optical fiber can be deployed in such networks in a manner which reduces bend losses in optical signals transmitted through the optical fiber. Some applications or optical components that utilize optical fiber can impose physical demands, such as tight bend radii, compression of optical fiber, etc., that induce bend losses. These fibers include a fluorine doped region (i.e., trench) in the cladding to minimize bend losses.

More specifically, bend insensitive optical fibers usually have an inner core region, surrounded by an inner cladding region, followed by a trench (low refractive index region, also referred as a trench herein) and an outer cladding region. The inner and outer cladding regions are typically pure silica, with the trench being silica doped with fluorine to achieve the negative index of refraction relative to silica. The optical fibers that have a trench shape such that the inside of the trench has refractive index that is significantly less negative than that on the outside of the trench (i.e. trapezoidal or triangular trench profiles are bend insensitive and have similar bend performance as compared to fibers with rectangular trenches, but also have larger mode field diameters (MFDs). Optical fiber profiles with these refractive index profiles can be achieved using a non-uniform fluorine doping process, where the core, inner cladding and the trench are deposited as a soot preform in a single step, and the fluorine doping is performed from outside at temperatures above 1300° C. during the sintering of the soot preform. However, Applicants discovered that when these fluorine doped preforms are sintered, the sintering process often results in preform failure.

Thus, a need exists for alternative methods to produce preforms having trench profiles where the inside of the trench has a much lower fluorine concentration compared to the outside of the trench, and which is not likely to result in preform failure due to fast sinter rates at high temperatures.

SUMMARY

According to some embodiments a method of making an optical fiber preform comprises in order the steps of:
(i) manufacturing a glass preform with at least one porous layer;
(ii) pre-densifying said preform to increase the average density of said porous glass layer to at least 0.7 g/cm3 but less than 1.9 g/cm3 thereby forming a pre-densified preform;
(iii) exposing the pre-densified preform to a fluorine precursor at a temperature at 1290° C. or less to make a pre-densified fluorine doped preform,
(iv) exposing the pre-densified fluorine doped preform to temperatures above 1400° C. to completely sinter the pre-densified fluorine doped preform to form the fluorine doped sintered preform; and thereby forming a fluorine doped profile in said fluorine doped sintered preform such that the ratio of the concentration of fluorine in an inner cladding region of the preform to concentration of fluorine in the outermost cladding region of the preform is less than 0.4.

According to some embodiments a method of making an optical fiber preform comprises in order the steps of:
(i) manufacturing a glass preform with at least one porous layer;
(ii) pre-densifying said preform to increase the average density of said porous glass layer to at least 0.7 g/cm³ but less than 1.9 g/cm³ thereby forming a pre-densified preform;
(iii) exposing the pre-densified preform to a fluorine precursor at a temperature at 1290° C. or less to make a pre-densified fluorine doped preform with the maximum concentration of fluorine at or adjacent to an outmost region of said pre-densified fluorine doped preform,
(iv) exposing the pre-densified fluorine doped preform to a second temperature above 1400° C. to completely sinter the fluorine doped preform; and thereby forming a fluorine doped profile in said fluorine doped sintered preform such that the ratio of the concentration of fluorine in an inner cladding region of the preform to concentration of fluorine in the region of the preform with maximum fluorine concentration is less than 0.4, and said inner cladding region is situated closer to preform center than said region with the maximum concentration.

According to some embodiments a method of making an optical fiber preform comprising in order: (i) manufacturing a glass preform with at least one porous layer; (ii) exposing the glass preform with at least one porous layer to a fluorine precursor at temperature below 1295° C. to make a fluorine treated preform, and (iii) exposing the fluorine treated glass preform with at least one porous silica based layer the temperatures above 1400° C. to completely sinter the preform. Preferably, the porous silica based layer of the glass preform exposed to fluorine precursor has average density of at least 0.7 g/cm³ but less than 1.9 g/cm³. Preferably, the ratio of t concentration of fluorine in the inside of the preform to concentration of fluorine in the outside of the preform is less than 0.4.

According to some embodiments a method of making an optical fiber preform comprises: (i) exposing the pre-densified preform with at least one porous glass layer having density of not less than 0.7 g/cm³ but less than 1.9 g/cm³ to fluorine precursor at temperature below 1295° C. to make a fluorine treated preform, (ii) exposing the fluorine treated preform the temperatures above 1400° C. to completely sinter the preform; and (ii) obtaining a fluorine doping profile where the ratio of the concentration of fluorine in the inside of the preform to concentration of fluorine in the outside of the preform is less than 0.4.

According to some embodiments a method of making an optical fiber preform comprises:
(i) manufacturing a glass preform with at least one porous layer,
(ii) pre-densifying said preform thereby increasing average glass density of said porous glass layer to at least 0.8 g/cm³ but less than 1.6 g/cm³;

(iii) exposing the pre-densified preform to fluorine precursor at a furnace temperature $T_{dope}$ not greater than 1290° C.;

(iv) exposing the pre-densified fluorine treated preform to the temperatures above 1400° C. to completely sinter the preform, thus eliminating porosity; and (v) preferably obtaining a fluorine doping profile where the ratio of the concentration of fluorine on the inside of the preform to concentration of fluorine on the outside of the preform is not greater than 0.4.

In at least some embodiments the exposure of the pre-densified preform to fluorine precursor is done for sufficient amount of time until the outer surface of pre-densified preform reaches a closed pore state, for example for at least 10 minutes. According to some embodiments the completely sintered preform has a glass density greater than 2 g/cm³, for example 2.2 g/cm³

According to some embodiments a method of making an optical fiber preform comprises the steps of:

manufacturing a glass preform with at least one porous glass layer having average glass density below 0.65 g/cm³;

pre-densifying said preform thereby increasing average glass density of said porous glass layer to at least 0.8 g/cm³ but less than 1.6 g/cm³;

exposing the pre-densified preform to fluorine precursor at temperature $T_{dope}$ below 1290° C.;

exposing the pre densified fluorine treated preform the temperatures above 1450° C. to completely sinter the preform.

In at least some embodiments the exposure of the pre-densified preform to fluorine precursor is done for sufficient amount of time until the outer surface of pre-densified preform reaches a closed pore state, for example for at least 10 minutes.

According to some embodiments a method of making an optical fiber preform comprises the steps of:

manufacturing a glass preform with at least one porous glass layer having average glass density below 0.65 g/cm³;

pre-densifying said glass preform thereby increasing average glass density of said porous glass layer to intermediate density $\rho_{in}$;

exposing the pre-densified preform to fluorine precursor at temperature below 1290° C., where the temperature $T_{dope}$ is chosen such that $5 \times 10^{-13} * [SiF_4]^{3/4}$ $6.5949 e^{(-2.63 \rho in)}/R^2 \leq T_{dope}/2 e^{(-55750/T)} \leq 5 \times 10^{-12} * [SiF_4]^{3/4} * 6.5949 e^{(-2.8063 \rho in)}/R^2$, where $T_{dope}$ is the doping temperature in K, and R is outer radius in cm of the pre-densified soot preform and $[SiF_4]$ is the partial pressure of $SiF_4$ in the doping gas mixture; exposing the pre-densified fluorine treated preform the temperatures above 1400° C. to completely sinter the preform and obtaining a fluorine doping profile, where the ratio of the concentration of fluorine on the inside of the preform to concentration of fluorine on the outside of the preform is less than 0.4. According to some embodiments the porous glass layer of the glass preform is a silica soot layer or a or silica based soot layer. According to some embodiments the glass preform is a silica based soot preform. According to some embodiments the pre-densified glass preform is a pre-densified silica based soot preform.

According to some embodiments a method of making an optical fiber preform comprises the steps of:

manufacturing a substrate with at least one porous glass layer having an average glass density below 0.65 g/cm³;

pressing second porous glass layer onto the said substrate such that the average glass density of pressed porous glass layer is at least 0.8 g/cm³ but less than 1.6 g/cm³; exposing the pre-densified preform to fluorine precursor at temperature at or below 1290° C., exposing the pre-densified fluorine treated preform to temperatures above 1400° C. and preferably above 1450° C. to completely sinter the preform; and obtaining a fluorine doping profile where the ratio of the concentration of fluorine on the inside of the preform to concentration of fluorine on the outside of the preform is less than 0.4. In at least some embodiments the exposure of the pre-densified preform to fluorine precursor is done for sufficient time $T_{dope}$ until the outer surface of pre-densified preform reaches a substantially closed pore state, for example for at least 10 minutes.

According to the exemplary embodiments described herein, the optical fiber preform formed using methods described above can have another cladding layer applied to it to form the final optical fiber preform that is then drawn into optical fiber for its use in a telecommunication or other systems.

Reference will now be made in detail to the present preferred embodiments, examples of which are illustrated in the accompanying drawings.

DETAILED DESCRIPTION

Figure 1A:
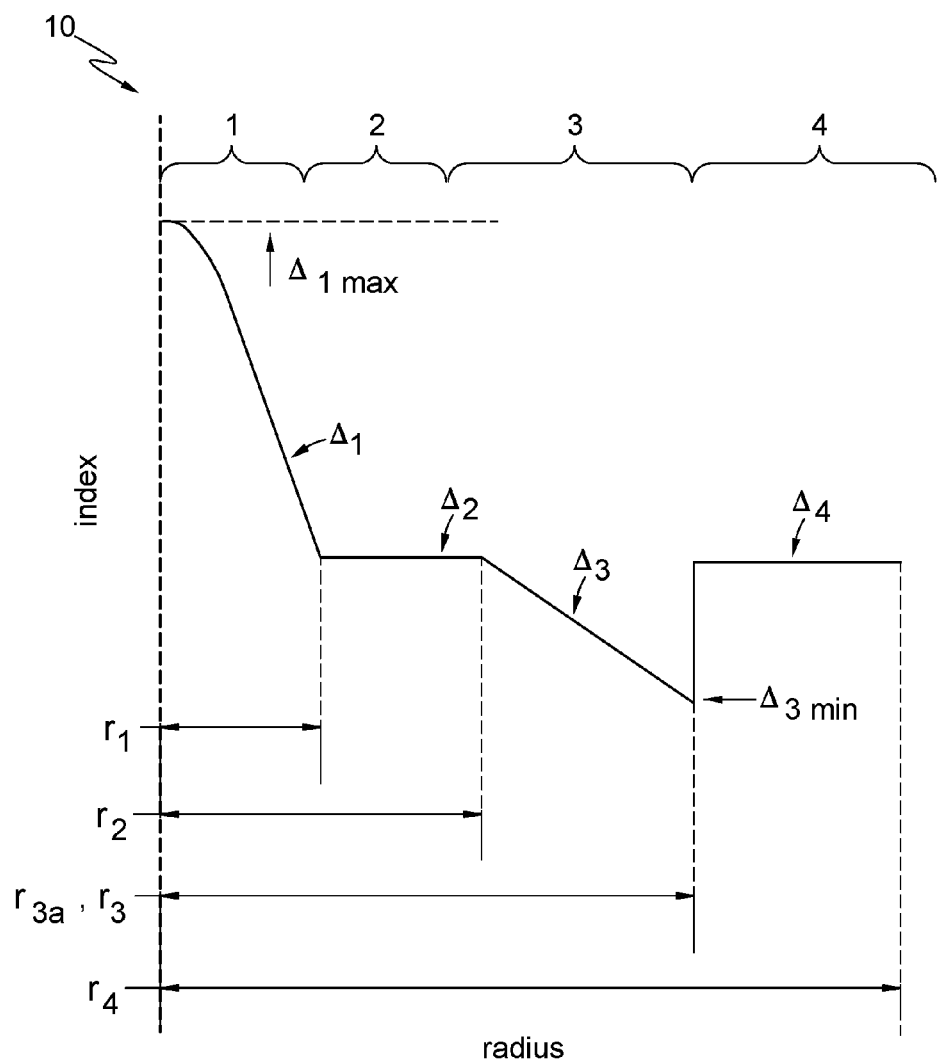
FIGS. 1A, 1B, and 2-5 illustrate schematic relative refractive index profiles corresponding to several embodiments of an optical fiber as disclosed herein.

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and optical fiber radius. The radius for each segment of the refractive index profile is given by the abbreviations $r_1$, $r_2$, $r_3$, $r_4$, etc. Lower an upper case are used interchangeably herein (e.g., $r_1$ is equivalent to $R_1$).

The "relative refractive index percent" is defined as $\Delta \% = 100 \times (n_i^2 - n_s^2)/2n_i^2$, and as used herein $n_s$ is the refractive index of pure silica. In cases where the refractive index of a region is less than the refractive index of pure silica, the relative index percent is negative and is referred to as having a depressed region or depressed index. In cases where the refractive index of a region is greater than the average refractive index of the refractive index of pure silica the relative index percent is positive and may be referred to as up-dopped. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine or boron. The terms alpha$_{core}$, and $\alpha$(core) refer to the core alpha and are used interchangeably herein. For a person skilled in the art, it will be obvious that the relative index profiles disclosed herein can be modified such that entire index profile is shifted linearly up or down relative to the index of pure silica, while still resulting in similar optical properties of the optical fibers (and thus equivalent fibers).

"Chromatic dispersion", herein referred to as "dispersion" unless otherwise noted, of an optical fiber is the sum of the material dispersion and the waveguide dispersion. The zero dispersion wavelength is the wavelength at which the dispersion has a value of zero. Unless otherwise noted herein, optical properties such as dispersion are reported for the LP01 mode.

The term "α-profile" refers to a relative refractive index profile of a region, expressed in terms of $\Delta(r)$ which is in units of "%", where r is the radius, which for the core alpha follows the equation 1, $$\Delta(r)=\Delta(r_o)(1-[|r-r_o|/(r_1-r_o)]^{\alpha(core)}) \quad \text{(Eq. 1)}$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is a real-valued exponent.

The mode field diameter (MFD) is measured using the Peterman II method as shown in equations 2 and 3, respectively wherein, $$2w=MFD \quad \text{(Eq. 2)}$$

and $$w^2=(2\int f^2 r dr/\int [df/dr]^2 r dr) \quad \text{(Eq. 3)}$$

wherein the integral limits being 0 to ∞, and f is the transverse component of the electric field associated with light propagated in the optical fiber.

The bend resistance of an optical fiber can be gauged by induced attenuation under prescribed test conditions, for example by deploying or wrapping the fiber around a mandrel of a prescribed diameter, e.g., by wrapping 1 turn around either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

As shown in FIGS. 1A, 1B and 2-5, according to some embodiments an optical fiber 10 includes: (i) a central core region 1 (or core) having outer radius r1, a relative refractive index $\Delta_1$, and a maximum relative refractive index $\Delta_{1max}$ and (ii) a cladding region (cladding) that surrounds the core 1, the cladding comprising an optional first inner cladding region 2, a trench 3, and an outer cladding region 4. The trench 3 has an inner radius r2 and an outer radius r3. The trench 3 comprises a relative refractive index $\Delta_3$ and a minimum relative refractive index $\Delta_{3min}$, such that its relative refractive index delta becomes more negative with increasing radius. The trench 3 helps make these fibers bend insensitive in performance. The outer cladding region 4 surrounds the trench 3 and has a relative refractive index $\Delta_4$.

In some embodiment, the core region 1, the optional inner cladding region 2 and the trench 3 are processed in one sequence of laydown and consolidation processes. The consolidated preform can then be redrawn and overcladed to provide the outer cladding region 4, in a second sequence of laydown and consolidation processes.

According to some embodiments optical fiber 10 includes an inner cladding region 2 with an outer radius $r_2$, and a trench 3 with an outer radius $r_3$. Preferably, the inner cladding region 2 is comprised essentially of pure silica. For these embodiments $r_1 < r_2$. In some embodiments, the optical fiber 10 does not include an inner cladding region 2 (see FIG. 4, for example). In these embodiments $r_1 = r_2$, and $\Delta_2 = \Delta_{3max}$.

Optical fibers 10 of FIGS. 1-5 include a central glass core region 1 (or core) comprising maximum relative refractive index delta percent $\Delta_{1max}$. The core region 1 can have a graded index profile. also referred to as a gradient or graded index profile herein. Optical fibers 10 of FIGS. 1A, and 2-5 may have core regions with the alpha$_{core}$ values ($\alpha_{core}$) where $0.5 \leq \alpha_{core} \leq 10$, in some embodiments $1 \leq \alpha_{core} \leq 5$, and in some embodiments $1.5 \leq \alpha_{core} \leq 2.5$. However, other embodiments have a step index core profile (see, for example, FIG. 1B), or have a core alpha greater than 10.

In some embodiments the graded index central core region 1 comprises fluorine doped silica and is essentially free of germania. In some exemplary embodiments the graded index core region 1 also includes at least one alkali metal oxide dopant, for example, where in the alkali is K (potassium), Na (sodium), Li (lithium), Cs (cesium), and, Rb (rubidium). In some exemplary embodiments the core region 1 contains $K_2O$ in the amounts of 20 ppm to 1000 ppm by weight % of K, more preferably between 50 and 500 ppm wt % of K, and most preferably between 50 and 300 ppm wt % of K. In some embodiments, the alkali doped fiber comprises a core 1 and/or inner cladding 2 that is germania free silica (preferably less than 1% germania by weight, more preferably less than 0.1% germania by weight). It is noted that the term "ppm", unless otherwise specially noted otherwise, refers to parts per million by weight, or ppm by weight, and a measurement in wt % can be converted to ppm by multiplying by a factor of 10,000. The methods disclosed below for non-uniformly doping the soot preform can also be used to make the graded index fluorine doped core for these fiber embodiments.

The inner cladding region 2 does not have a constant $\Delta_3(r)$. Preferably $\Delta_3(r)$ decreases with increasing radius and may have a triangular cross-section. According to some embodiments trench 3 has an alpha profile described by a trench alpha parameter, alpha, where $0.5 \leq alpha \leq 5$. In the embodiment shown herein the trench 3 comprises silica doped with fluorine. In some embodiments, $\Delta_{3min}$ is less than or equal to −0.2%. In some embodiments, $\Delta_{3min}$ less than or equal to −0.35%.

Figure 1B:
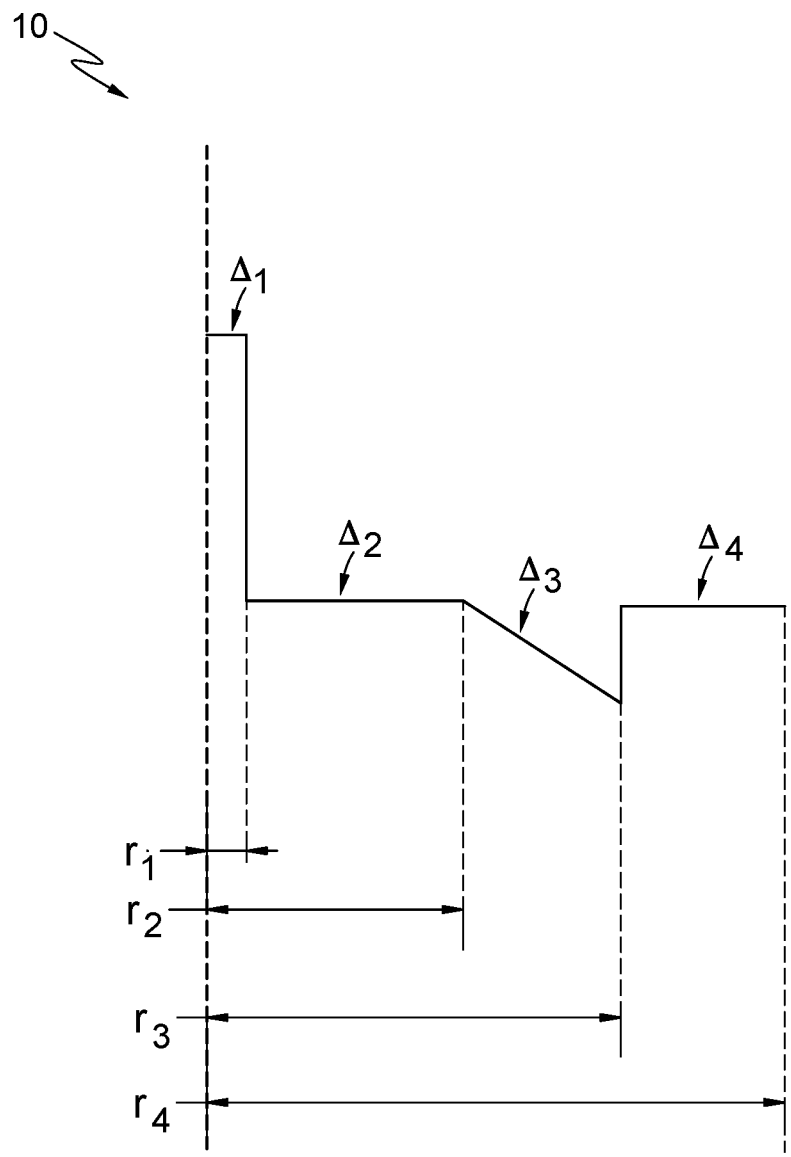

More specifically, FIGS. 1A and 1B illustrate a relative refractive index profile $\Delta_3(r)$ of an embodiment of fiber 10 that has a triangular trench profile. This figure shows that the relative refractive index of the trench 3 monotonically decreases with increasing radius, and $\Delta_3(r_2) > \Delta_3(r_3)$.

Figure 2:
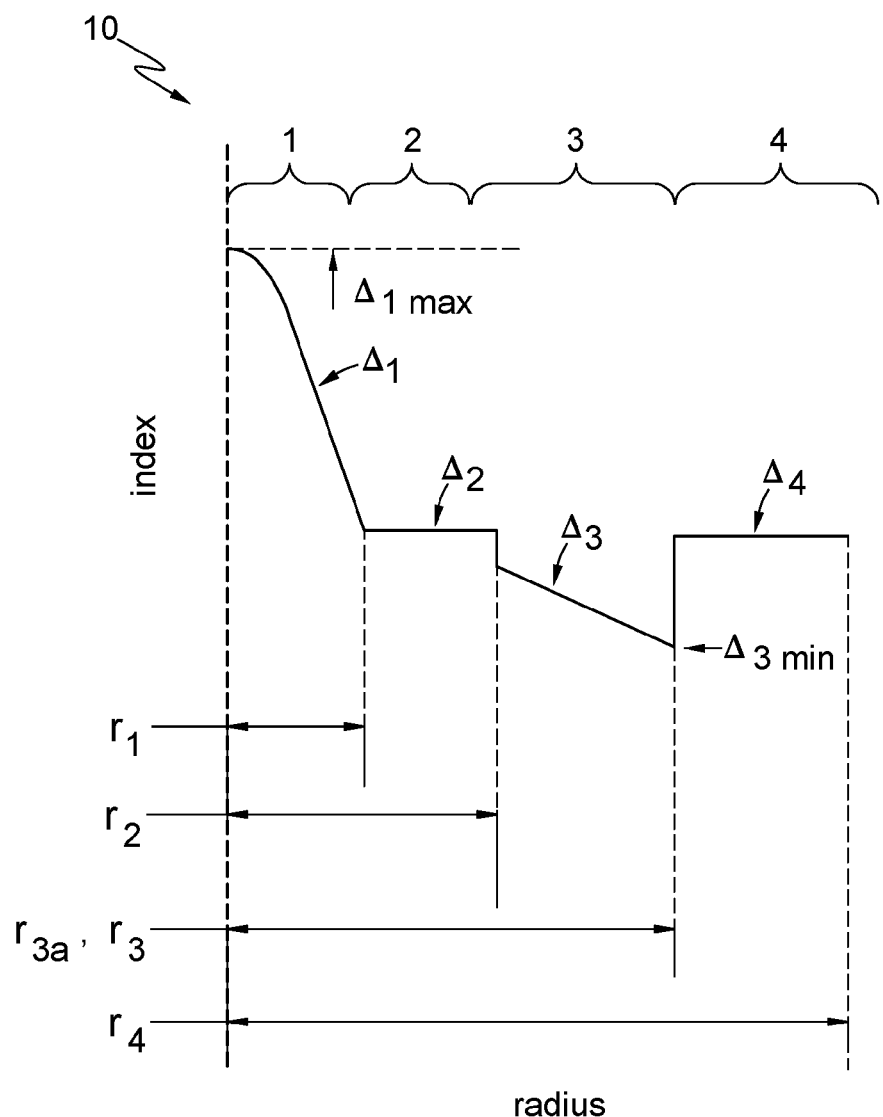

FIG. 2 illustrates a relative refractive index profile of embodiment of fiber 10 that has a trapezoid-shaped trench profile. In this embodiment the relative refractive index of the trench 3 also decreases with increasing radius, and $\Delta_3(r_2) > \Delta_3(r_3)$. In the embodiment of FIG. 2 $\Delta_2 = \Delta_4$, but in some embodiments $\Delta_2$ and $\Delta_4$ have different values (e.g., $\Delta_2 > \Delta_4$, or $\Delta_2 < \Delta_4$). For example, in an embodiment where $\Delta_2 < \Delta_4$, the inner cladding region 2 may comprise pure silica, while trench 3 comprises silica doped with fluorine and the outer cladding region 4 is an updoped silica.

Figure 3:
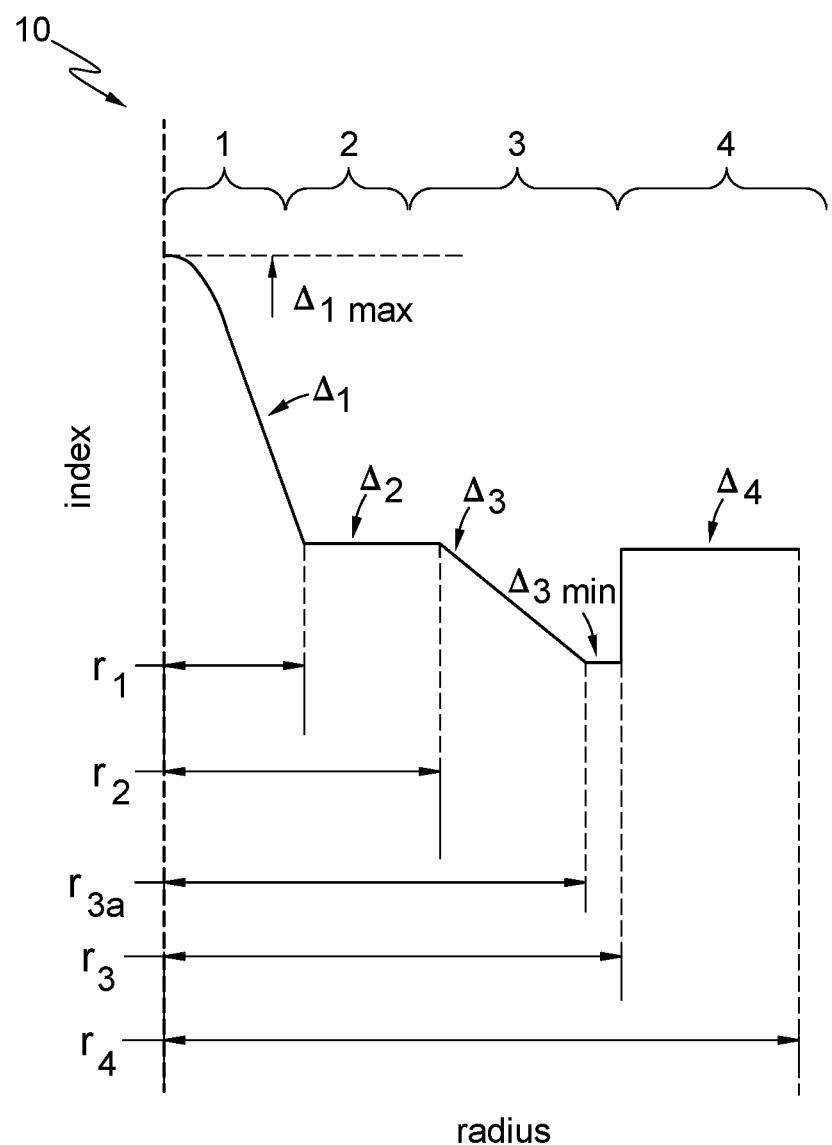

FIG. 3 illustrates a relative refractive index profile of another embodiment of fiber 10. In this embodiment the relative refractive index of the trench 3 monotonically decreases with increasing radius until it reaches a value $r=r_{3a}$, and then is constant between the radii $r_{3a}$ and $r_3$. In this embodiment $\Delta_3(r_2) > \Delta_3(r_3)$ and $\Delta_3(r_2) > \Delta_3(r_{3a})$. As shown in FIG. 3, for example, radius $r_{3a}$ is the radius where the value $\Delta_{3min}$ is first reached, moving radially outward from the centerline. In some embodiments, $r_{3a}=r_3$. (See, for example, FIGS. 1A, 1B, 2, 4 and 5).

Figure 4:
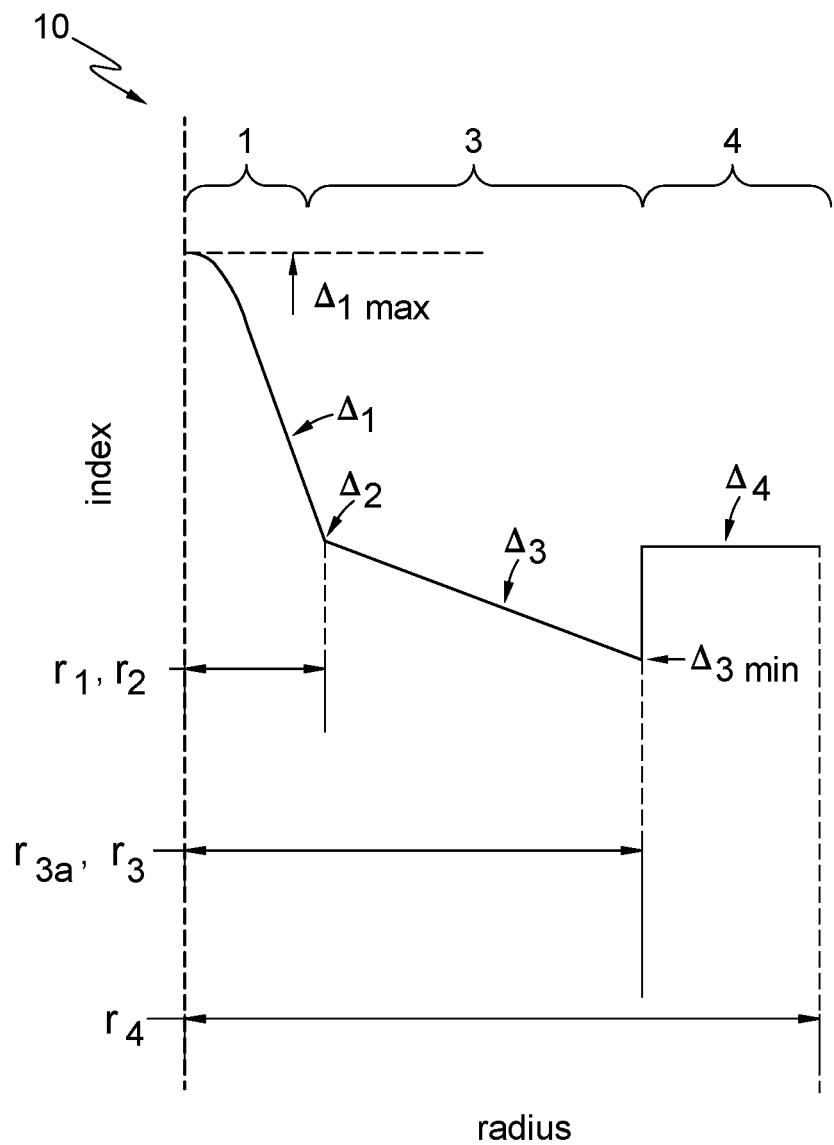

FIG. 4 illustrates the relative refractive index profile of an embodiment of fiber 10 that also has a trench profile that is similar to the profile of FIG. 1, but in FIG. 4 the width of the inner cladding region is zero, i.e., this fiber embodiment does not have the inner cladding region. In this embodiment $r_1=r_2$.

Figure 5:
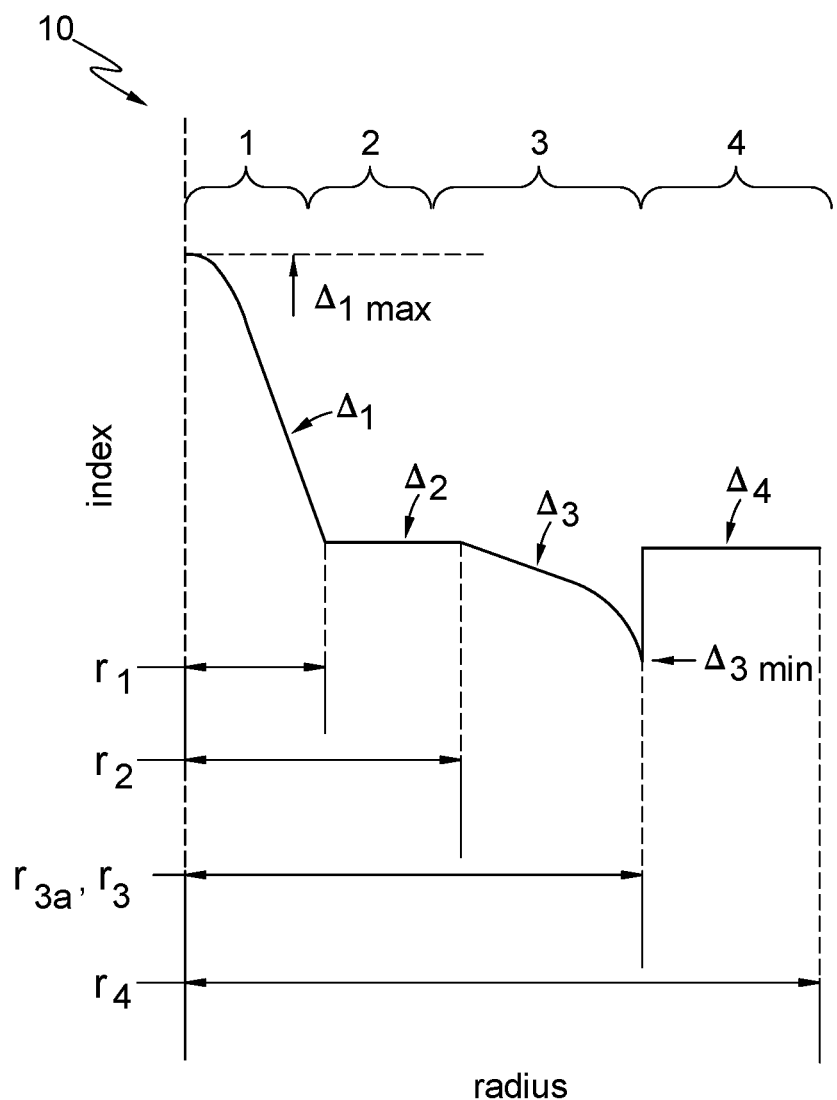

FIG. 5 illustrates relative refractive index profile of an embodiment of fiber 10 that also has a trench profile and that is similar to the profile of FIG. 1, but in FIG. 5 the relative refractive index profile of the trench 3 has a convex portion. That is, the relative refractive index of the trench 3 decreases relatively slowly in a region close to the inner cladding region 2 and then relatively rapidly as the radius approaches $r_3$.

Again, with reference to FIGS. 1A, 1B, and 2-5, Optical fibers 10 have optical fiber profiles that include a trench 3, with the refractive index depression of the trench 3 increasing gradually with increasing radial position inside the trench 3. The refractive index depression on the inside of the trench 3 is significantly smaller than the refractive index depression on the outside of the trench 3. That is, the relative refractive index delta is more negative in the outer portion of the trench 3 than in the inner portion of the trench 3 (e.g., $\Delta_3(r_2) > \Delta_3(r_3)$). This is due to higher concentration of fluorine in the outer portion of the trench 3 relative to that of the inner portion. In certain embodiments, the absolute value of the relative refractive index delta of the inside of the trench 3 is less than 0.4 of the absolute value of relative refractive index on the outside of the trench region. That is, in these embodiments, $|\Delta_{3max}| < 0.4|\Delta_{3min}|$, or $|\Delta_3(r_2)| < 0.4|\Delta_3(r_3)|$. In some other embodiments, the absolute value of the relative refractive index delta of the inside of the trench 3 is less than 0.3 of the absolute value of the relative refractive index delta on the outside of the trench 3. That is, in these embodiments, $|\Delta_{3max}| < 0.3|\Delta_{3min}|$, or $|\Delta_3(r_2) < 0.3|\Delta_3(r_3)|$. In some embodiments, the absolute value of the relative refractive index delta of the inside of the trench 3 is less than 0.2 of the absolute value of the relative refractive index delta on the outside of the trench 3. That is, in these embodiments, $|\Delta_{3max}| < 0.2|\Delta_{3min}|$, or $|\Delta_3(r_2)| < 0.2|\Delta_3(r_3)|$. In some embodiments, the absolute value of the relative refractive index delta of the inside of the trench 3 is less than 0.1 of the absolute value of the relative refractive index delta on the outside of the trench 3. That is, in these embodiments, $|\Delta_{3max}| < 0.1|\Delta_{3min}|$, or $|\Delta_3(r_2)| < 0.1|\Delta_3(r_3)|$. In some embodiments, the relative refractive index delta of the inside of trench 3 is substantially zero. In such embodiments, the inner cladding region 2 and outer cladding region 4 are substantially comprised of silica with inner cladding region 2 doped with fluorine and having no fluorine doping on the inside edge of the trench 3.

As described above, trench 3 is surrounded by an outer cladding region 4. In some embodiments, the outer cladding 4 is comprised essentially of silica. In some other embodiments, the outer cladding 4 is updoped by doping the cladding with dopants such as chlorine, germania, alumina, and/or other dopants. The optical fiber embodiments corresponding to FIGS. 1A, 1B and 2-5 above have optical properties that are compatible with ITU-G.652 standard recommendations and have bend loss of less than 0.5 dB/turn for the fiber bend around a 15 mm diameter mandrel and a bend loss of less than 0.1 dB/turn for the fiber bend around a 20 mm diameter mandrel at wavelength of 1550 nm. The optical fibers 10 exhibit a cable cutoff of less than 1260 nm and have the zero dispersion wavelength between 1300 nm and 1324 nm.

Optical fibers 10 with the trench relative refractive index trench profiles described above have bend performance comparable to optical fibers with rectangular trench profiles, but have higher mode field diameters (MFD). To achieve the high MFD and still have low bend loss, the trench profile must be accurately controlled during the first consolidation process. Obtaining both the desired $\Delta_{3min}$ and the value of $r_2$ are important to achieve desired moat volume, dispersion and cutoff properties.

The optical fibers 10 disclosed herein may be drawn from optical fiber preforms 100 using known fiber draw methods and apparatus. The preforms 100 are made by creating a soot, doping it with fluorine and then consolidating the fluorine doped preform, to produce a preform comprising the core region 1, the optional inner cladding region 2 and the trench 3. However, we discovered that when the relative refractive index profiles disclosed above are created by doping of optical fiber preforms with fluorine precursors during consolidation at doping temperatures that are higher than 1300° C., large stresses are induced during the consolidation process that can cause optical preform split, thus causing preform failure. More specifically, the preform F-doping at temperatures that are higher than 1300° C. results in fast sinter rates of the preforms, which can induce high sinter stresses that can cause preform splits, and thus impact preform integrity.

We recognized that sinter stress results from the differential sintering rates of a low viscosity fluorine doped region (i.e., the trench on the outsider portion of the preform) and a higher viscosity inner region of the optical preform. That is, we recognized that doping with fluorine at higher temperatures can result in preform failure due to internal split between different preform layers that sinter at different sinter rates due to layer viscosity differences, and more specifically because of the fast sinter rates encountered by both the fluorine doped region and other doped regions of the preform at temperatures above 1300° C. We also discovered that doping the optical fiber preform with fluorine at lower temperatures (preferably at temperatures between 1225° C. and 1290° C.) avoids or minimizes this problem.

Optical fiber profiles with the refractive index profiles disclosed above can be produced using a non-uniform fluorine doping process of the optical fiber preform, where F-doping is performed at temperatures below 1295° C. More specifically, the preform layers corresponding to the fiber's core, inner cladding and the trench of the cladding are deposited as a glass soot to create a soot preform 100A, and the fluorine doping of at least the preform portion corresponding to the trench region is performed in a single step from outside, preferably at temperatures at below 1290° C., before the full sintering of the F-doped soot preform. However, to achieve the non-uniform fluorine doped trench profiles in trench 3, it is preferable to pre-densify the glass soot preform to increase its density and reduce the porosity before the preform is exposed to fluorine precursor. Various exemplary embodiments for making an optical fiber preform will be further clarified by the following examples.

According to some embodiments, in order to achieve the non-uniform relative refractive index profile in the preform by doping it at temperatures not more than 1290° C., the preform 100A is pre-densified by partially consolidating the preform from its deposited density to a pre-densified density of 0.8-1.6 g/cm$^3$. The pre-densified preform 100B is then exposed to fluorine precursor for fluorine doping at a temperature $T_{dope}$ that is less than 1290° C., and more preferably less than 1275° C. The fluorine doping temperature $T_{dope}$ is preferably higher than 1225° C., and even more preferably higher than 1250° C. The degree of penetration that the fluorine undergoes in the optical fiber preform (i.e., how far it penetrates into the preform) at a given doping temperature $T_{dope}$ depends on the size (outer radius) and density of the pre-densified preform 100B. The higher the density of the pre-densified preform 100B, the smaller is the penetration distance of the doped fluorine in the optical fiber preform 100C.

According to some embodiments, the penetration distance of fluorine into the soot preform is limited such that fluorine does not penetrate all the way to the center of the preform. Thus, the core, inner clad and trench portions of the preform can be deposited (for example by the OVD process) to make soot preform 100A. The preform 100A is pre-densified, and non-uniform fluorine doping of the pre-densified preform is performed in a single step at a temperature $T_{dope}$ of not greater than 1290° C. such that fluorine penetration is limited to only the trench, with no fluorine doped in the portion of the preform corresponding to fiber core and the inner cladding region. That is, the entire preform soot assembly (i.e., the entire core-inner clad-trench assembly of preform 100B) is doped with fluorine in a single step, before it is fully sintered to non-porous glass preform 100D. Such sintered glass preform is further processed by applying the outer cladding to make the final optical fiber preform 100, from which the optical fiber can be drawn.

According to some embodiments, in order to have a robust manufacturing process that doesn't negatively impact the preform integrity, preform 100B is doped with fluorine precursor (for example with $SiF_4$, $CF_4$, $C_2F_6$, and/or $SF_6$) at temperatures less than 1295° C. and preferably less than 1290° C., which yields a fluorine doping profile where the inside of the doped preform 100C has doped fluorine concentration that is less than 0.4 of the doped fluorine concentration on the outside of the optical preform. In some embodiments, the inner portion of the F doped preform 100C has doped fluorine concentration that is less than 0.3, and in some embodiments less than 0.2 of the doped fluorine concentration on the outside of the preform 100C. In some embodiments, the inner part of the doped preform 100C has doped fluorine concentration that is less than 0.1 of the fluorine concentration on or adjacent to the outside of the preform 100C. In some other embodiments, the fluorine doesn't penetrate the complete preform and the penetration of fluorine is limited to outer 70% of the doped preform 100C (i.e., F penetrates not more than the outer 70% portion of the preform in radial coordinates). For example, in some embodiments the penetration of fluorine is limited to outer 50% of the doped preform 100C, and in some embodiments outer 45%, 40%, 35%, 30% or 25% of the preform 100C. If the fluorine penetration is limited to outer portion of the preform, it is possible to process a combined core, inner cladding and trench soot preform assembly in a single step and dope it with fluorine from outside, and then sinter to form a sintered glass optical fiber preform having a required trench profile.

After the F-doped preform 100C is sintered, the resultant sintered (non-porous) preform 100D will have a fluorine concentration profiles similar to preform 100C. Thus, in some other embodiments, the fluorine presence is limited to the outer 70% of the sintered preform 100D, for example to the outer 50% of the preform 100D, or to the outer 45%, 40%, 35%, 30%, and in some embodiments to not greater than outer 25% of the preform 100D. Similarly, the preform 100D has doped fluorine concentration that is less than 0.4 of the doped fluorine concentration on the outside of the preform. In some embodiments, the inner portion of preform 100D has doped fluorine concentration that is less than 0.2 of the doped fluorine concentration on the outside of the preform 100D. In some embodiments, the inner part of the doped preform 100D has doped fluorine concentration that is less than 0.1 of the fluorine concentration on or adjacent to the outside of the preform 100D.

Thus, the embodiments of the method described herein achieve the goal of providing an effective F doping process of the optical fiber preform, at temperatures $T_{dope}$ below 1295° C. and preferably below 1290° C., in order to avoid the problem of internal fracture(s) or splitting within the preform. The doping of the preform is achieved by exposing the preform to a fluorine doping precursor, examples of which include $SiF_4$, $C_2F_6$, $CF_4$, or $SF_6$.

We recognized that substantial doping temperature reduction could be achieved by modifying the density of blanks (also referred to as preform herein) using a pre-sintering step (i.e., by subjecting the soot preform 100A to pre-densification prior to fluorine doping from outside) to create a pre-densified preform 100B. The increased density (and therefore lower porosity) of the preform 100B serves to limit fluorine (e.g., $SiF_4$ dopant gas) diffusivity during the F-doping step, as F1 diffuses inward form the outermost region of the pre-densified preform 100B. The degree of pre-densification and thus preform density after pre-densification controls the amount of penetration of fluorine from the outside into the preform and thus enables a designed relative refractive index profile to be achieved at F doping temperatures $T_{dope}$ below 1295° C. (e.g., below 1290° C.). The F-doped preform 100C is sintered to provide the sintered non porous optical fiber preform 100D, which is then preferably overclad. The outer cladding layer is applied to the optical fiber preform 100D to make the final optical fiber preform 100, which is utilized to draw optical fiber 10 for use in telecommunication or other systems. The outer cladding layer can be formed by depositing soot onto the optical fiber preform 100D and subsequently sintering the soot layer. Alternatively, the final optical fiber preform 100 can be made by sleeving the outer clad layer on the optical fiber preform 100D. In other embodiments, the final optical fiber preform 100 can be made by pressing a soot outerclad layer on the preform 100D and sintering the pressed soot layer.

According to some embodiments a method of making an optical fiber preform 100 comprises the steps of: (i) providing a preform 100B with at least one porous glass layer having average soot density (also referred to herein as intermediate density Pin) greater than 0.7 gm/cm$^3$ and preferably less than 1.9 gm/cm$^3$ (e.g., greater than 0.75 gm/cm$^3$, or greater than 0.8 gm/cm$^3$, more preferably greater than 0.9 gm/cm$^3$); (ii) doping this preform 100B with fluorine at temperatures below 1295° C. (preferably at or below 1290° C.) to create a fluorine doped preform 100C; and (iii) fully sintering the F doped preform 100C to create a perform 100D.

According to some embodiments the method of making an optical fiber preform 100 comprises the steps of: (i)

manufacturing a glass preform 100A with at least one porous glass layer having an average soot density of less than 0.65 gm/cm³; (ii) pre-densifying the glass preform 100A so that this porous glass layer has an average soot density of greater 0.7 gm/cm³, and less than 1.9 gm/cm³, to create a pre-densified preform 100B; (iii) doping the pre-densified preform 100B with fluorine (F) at temperatures below 1295° C., preferably at or below 1290° C.; and (iv) fully sintering the F doped preform 100C to create a perform 100D. Preferably the pre-densified glass preform 100B has an average soot density of greater 0.75 gm/cm³ and less than 1.7 gm/cm³, for example between 0.8 and 1.5 gm/cm³. Preferably the pre-densified preform 100B is doped with fluorine until the outer surface of pre-densified F-doped preform 100C reaches a closed pore state (i.e., a state where fluorine no longer can penetrate into the preform), for example for at least 10 min (e.g., 10 min to 24 hrs, more preferably 10 min to 2 hrs).

In these exemplary embodiments, pre-densification step is performed in F-free environments. The sintering of the preform 100C is preferably done at temperatures above 1400° C., for example at 1450° C. to 1600° C.

In at least some of the above embodiments, preform 100D has been supplied with the outer clad layer to make the final optical fiber preform 100. The outer cladding layer can be applied by direct deposition of soot on preform 100D and then sintering it. Alternatively, the outer cladding layer is applied by sleeving onto the preform 100D, while in other embodiments it is applied by pressing soot onto preform 100D and sintering it to form the final preform 100. The final optical fiber preform 100 can be drawn into optical fiber 10.

It is noted that the OVD blanks (i.e., preforms made by the OVD process) can generally be practically produced with an average soot density of only up to 0.7 g/cc for preforms of 6000 g on a 1 meter long bait rod, and the average soot density is even lower in preforms with larger sizes made by this process. In practice, increasing the average laydown density to greater than 0.75 g/cc, even in preforms that weigh 6500 g (115 mm in diameter) is difficult, because the preforms frequently fracture at higher laydown density and because of the negative impact on soot deposition efficiency during laydown of high density preforms. Thus, it is preferable for OVD made blanks (preforms 100A made by a standard OVD process) to undergo pre-densification prior to doping them with fluorine.

Soot preforms 100B with higher soot densities (i.e., soot preforms) can be produced by alternative methods, such as radial or axial soot pressing, or soot casting. These processes can result in higher density (0.7 gm/cm³ or greater, for example about 0.7 gm/cm³ to about 1.0 gm/cm³).

Figure 9:
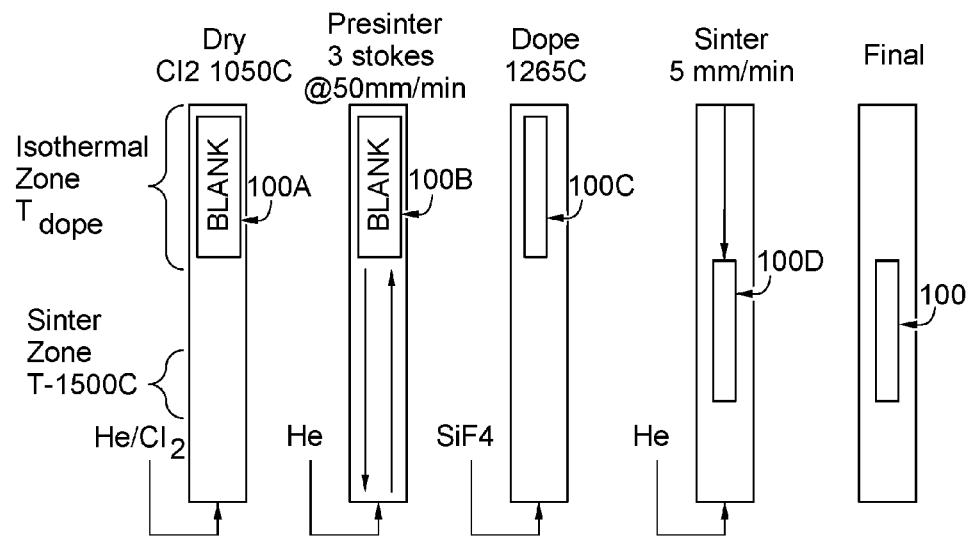
FIG. 9 illustrate schematically another embodiment of optical preform making method.

Yet another way to achieve higher soot density in a preform 100B, prior to its fluorine doping, is to pre-densify soot by subjecting it to a high temperature for a short period of time in a fluorine free environment, so as to pre-densify silica soot, but not to fully sinter the resulting soot preform 100B. This pre-densification step can be performed, for example, by moving the preform 100A through a heat zone of 1400° C. or higher temperature at a fast rate (e.g., >25 mm/min), to provide soot densities in the 0.7 gm/cm³ to 1.8 gm/cm³ range, thereby making the pre-densified preform 100B. With reference to FIG. 9, for example, in one embodiment the preform 100A was pre-sintered by moving it 3 times through the sinter zone of the furnace (temperature of 1500° C.) at the rate of 50 mm/min.

We recognized that fluorine diffusivity in this higher density preforms 100B helps, in conjunction with low fluorine F-doping temperatures (<1295° C.) during the fluorine doping step, advantageously achieve the required fluorine doping profile, resulting in preform 100D with the desired refractive index profile. Advantageously, preforms 100D made by the method(s) of the embodiments described herein are not susceptible to internal fracture or split between layers common to preforms that are F doped at higher temperatures (>1300° C.). The preform 100D can then be overclad to create preform 100 from which the optical fiber 10 can subsequently be drawn.

The fluorine doped profile achieved in preforms 100C has fluorine concentration on the inside of the preform that is substantially less than the fluorine concentration on the outside of the preform. As discussed above, in some embodiments, the concentration of fluorine on the inside of the preform 100C (and thus of the preform 100D) is not greater than 0.4 of the concentration on the outside of the preform. In other embodiments it not greater than 0.3 or 0.2 and in some embodiments, less than 0.1 of the concentration on the outside of the preform. In yet other embodiments, fluorine doesn't reach all the way through to the inside of the preform and its penetration is limited to only the outer portion of the preform. In some embodiments, fluorine penetration in the preform is limited to less than the outer 70% of the preform (e.g., to less than the outer 50% or even to less than the outer 25% of the preform). The penetration distance of fluorine in the sintered preform 100D depends on the density of the preform after the pre-densification step (i.e., on the density of the preform 100B). As the density after the pre-densification step increases, the diffusivity of the fluorine through the pores decreases, resulting in less penetration into the preform. The density of the preform 100B after the pre-densification step is, for example, preferably higher than 0.8 gm/cm³, more preferably higher than 1.2 gm/cm³ and even more preferably higher than 1.4 gm/cm³. The density of the preform 100B after the pre-densification step is, for example, less than 1.8 gm/cm³, more preferably less than 1.7 gm/cm³ and even more preferably less than 1.6 gm/cm³. The exact amount of penetration depends on density after the pre-densification step, the size of the preform along with the concentration of fluorine used in the doping step.

It is noted that due to the dynamic nature of the fluorine doping method, the fluorine doping profile is simultaneously impacted by the fluorine doping temperature, preform porosity after the pre-densification step (i.e., porosity of the preform 100B) and preform size (i.e., the size of the preform 100B). With respect to control of the fluorine doping profile, it is possible define empirically a relationship between the slope of the trench in a preform profile to the A parameter (also referred to as penetration parameter A) that defines a relationship between the preform radius, the preform density and the doping temperature. The slope of the trench 3 of the optical preform 100D can be defined as $(r_3-r_2)/(\Delta_{3min}-\Delta_2)$, where $r_2$ and $r_3$ are the radii in the preform that correspond to the radii $r_2$ and $r_3$ in the resulting fiber.

We discovered that during exposure to a particular fluorine dopant concentration, that it is preferable to satisfy the following inter-relationship between the doping temperature, the preform radius and the preform density, and penetration parameter A:

$$A = 1 \times 10^{12} * R^2 * T_{dope}^{1/2} e^{(-55750/T_{dope})} / (6.5949 e^{(-2.8063 \rho in)} * [SiF_4]^{3/4}) \qquad \text{Eq. 1}$$

where R is the blank radius and $pi_{in}$ is the preform density in g/cc in cm, both at the of the preform about to be F-doped, $[SiF_4]$ is the partial pressure of $SiF_4$ in the doping gas mixture and $T_{dope}$ is the furnace temperature in degrees kelvin. It is noted that, for a the same amount of F precursor present, when the R, $\rho_{in}$ and $T_{dope}$ are adjusted to provide the same A value, the preform will retain the same fluorine doped profile shape in normalized radial space. It should also be noted that while $SiF_4$ is used in the exemplary description of the fluorine doping process, other fluorine precursors, such as $CF_4$, $SF_6$, $C_2F_6$ etc. can also be utilized.

Thus, according to some embodiments a method of making an optical fiber preform 100D comprises the steps of:

(i) manufacturing a glass preform 100A with at least one porous glass layer having initial average soot glass density $\rho_1$ below 0.65 g/cm³;

(ii) pre-densifying the glass preform 100A (in F free environment, if done under high temperatures) thereby increasing average glass density of the porous glass layer to intermediate average density $\rho_{in}$ to form the pre-densified preform 100B. The pre-densification should be sufficient to enable a doping temperature of <1295° C. and preferably less than 1290° C. to avoid risk of preform failure (iii) exposing the pre-densified preform 100B (from the outside) to fluorine precursor at temperature $T_{dope} \leq 1290°$ C. to form F-doped preform 100C, where the temperature $T_{dope}$ is chosen to satisfy the following equation $5 \times 10^{-13} * [SiF_4]^{3/4} * 6.5949 e^{(-2.8063 \rho in)}/R^2 \leq T_{dope}^{1/2} e^{(-55750/Tdope)} \leq 5 \times 10^{-12} * [SiF_4]^{3/4} * 6.5949 e^{(-2.8063 \rho in)}/R^2$, where R is outer radius the soot preform 100B;

(iv) exposing the pre-densified fluorine treated preform 100C to a second temperature above 1400° C. (preferably above 1450° C.) to completely sinter the fluorine doped preform 100C, thereby creating a non-porous sintered preform 100D and (v) preferably obtaining a fluorine doping profile where the ratio of the concentration of fluorine on the inside of the preform 100D to concentration of fluorine on the outside of the preform 100D is no more than 0.4 (for example not more than 0.35, 0.3, 0.24, 0.2, or not more than 0.1).

According to some embodiments, the pre-densified preform 100B is exposed to fluorine precursor at temperature $T_{dope}$, such that $T_{dope} \leq 1290°$ C., until the outer surface of pre-densified F-doped preform 100C reaches a closed pore state—i.e., until substantially no more F can penetrate (for example, 10 min to 24 hrs, or 10 min to 2 hrs).

According to some embodiments a method of making an optical fiber preform 100D comprises the steps of:

(i) manufacturing a preform 100A with at least one porous glass layer having average glass density below 0.65 gm/cm³;

(ii) pressing a second porous glass layer onto the preform 100A such that the average glass density of at least the pressed porous glass layer is at least 0.8 gm/cm³ but less than 1.8 gm/cm³ and preferably to at least 0.9 gm/cm³ but less than 1.6 gm/cm³ to create a pre-densified preform 100B;

(iii) exposing the pre-densified preform 100B (from the outside) to a fluorine precursor at temperature $T_{dope}$ that is below 1290° C., for example until the outer surface of pre-densified preform reaches a closed pore state (e.g., preferably for at least 10 min) to create a fluorine treated preform 100C;

(iv) exposing the pre-densified fluorine treated preform 100C to temperatures above 400° C. and preferably above 1450° C. to completely sinter the preform. Preferably sintering temperatures are 1400° C. to 1600° C., and more preferably between 1450° C. to 1550° C., and obtaining a fluorine doping profile where the ratio of the concentration of fluorine on the inside of the preform to the concentration of fluorine on the outside of the preform is less than 0.4.

According to at least one embodiment, applicants achieve the non-uniform fluorine doping of the preforms 100B at temperatures $T_{dope}$ below 1290° C. to create an F doped preform 100D, using the following process steps:

(i) Making pre-densified preform 100B: Preforms 100A with average laydown densities below 0.65 g/cm³ are exposed in a fluorine-free environment to a high temperature for a period of time (pre-sinter), such that the average preform soot density increases to greater than 0.8 gm/cm³, more preferably greater than 0.9 gm/cm³, even more preferably greater than 1 g/cm³ and even more preferably greater than 1.1 g/cm³, but less than 1.9 gm/cm³. Preferably the average soot density is less than 1.8 g/cm³, more preferably less than 1.7 g/cm³, and even more preferably less than 1.6 g/cm³, to provide enough porosity to allow the fluorine to penetrate from outside through the pores for the desired distance towards the inner region of the preform. This pre-densification step shrinks the pore size thereby decreasing the diffusion rate of gas species through the porous preform during the F doping step (next step);

(ii) Making F doped preform 100C: The pre-densification of the preform (made by the previous step, for example) is followed by exposure of the preform 100B to fluorine precursor (e.g., $SiF_4$, $CF_4$, $C_2F_6$, $SF_{6-}$) at temperatures $T_{dope} \leq 1290°$ C., more preferably at temperatures below 1280° C., for example at temperatures below 1270° C. The exposure time for fluorine doping is preferably sufficiently long to allow the outer surface of the blank to reach a closed pore state, usually longer than 15 minutes, more preferably longer than 30 minutes and even more preferably longer than 45 minutes, but these depend on the actual doping temperature $T_{dope}$ utilized during the fluorine (F) doping step. Preferably the fluorine exposure is performed at a temperature $T_{dope}$ higher than 1225° C., for example higher than 1230° C.;

(iii) Increasing the temperature above 1400° C. and sintering the preform 100C at a temperature of at least 1400° C. to completely sinter and clarify the preform, thereby creating a non-porous sintered preform 100D. Preferably, the sintering temperature is at least 1430° C., and more preferably at least 1450° C., for example 1500° C. to 1600° C.

The preform 100D can have an outer clad layer applied to it, in order to make the final optical fiber preform 100. As discussed above, the outer clad layer may be applied by depositing the outer clad as a soot layer and then sintered. Alternatively, the outer cladding layer can be applied by using a glass sleeve, and sleeving it to the preform 100D in a redraw step to create the preform 100.

According to some embodiments, the resulting fluorine profile is such that maximum fluorine concentration is at or adjacent the outside of the preform 100C (e.g., in a maximum concentration region), and fluorine concentration in the inner region of the preform 100C is less than 10% of the maximum concentration. In some embodiments, doped fluorine profile is such that no fluorine is doped in the inner 15% of the preform 100C, more preferably in the inner 25% of the preform 100C and even more preferably in the inner 35% of the preform 100C.

The degree of penetration of fluorine in the sintered preform depends on the size and average density of the preform after the pre-densification step. As the density after the pre-densification step increases, the diffusivity of the fluorine through the pores decreases resulting in less penetration of fluorine in the preform. The average density of the preform after the pre-densification step (i.e., the average density of preform 100B) is preferably higher than 0.8 gm/cm³, for example higher than 0.9 gm/cm³, or higher than 1 gm/cm³, 1.1 gm/cm³, or 1.2 gm/cm³ and, or 1.3 gm/cm³, and in some embodiments higher than 1.4 gm/cm³. The average density of the preform after the pre-densification step is smaller than 1.8 gm/cm³, more preferably smaller than 1.7 gm/cm³ and even more preferably smaller than 1.6 gm/cm³. The exact amount of F penetration depends on the average density after the pre-densification step (average as well as the density profile), the size (radius) of the preform 100B, and the concentration of fluorine used in the F-doping step.

According to one exemplary embodiment, a 4500 g silica soot preform 100A with a laydown density of 0.48 g/cm³ and length of 1 m was created using the OVD process. The preform was dried in a furnace at 1125° C. in a 2.9% $Cl_2$/He gas mixture for 60 minutes. The temperature of the furnace was then increased to 1265° C. in a 10 minute period, and the preform 100A was then pre-densified at 1265° C. for 8 hours to form preform 100B. Modeling of the preform 100B for the above conditions predicted preform density of around 1 g/cm³ on the inside of the preform 100B and 1.13 g/cm³ on or near the outside of the preform 100B, at the end of the pre-densification step. Subsequently, the pre-densified preform 100B was exposed to 20% $SiF_4$/He environment ($SiF_4$ partial pressure of 0.2 atm.) at a temperature of 1265° C. for 60 minutes to create F-doped preform 100C, followed by a final sintering step that included increasing the temperature to peak temperature of the furnace to 1500° C., which resulted in a preform 100D.

Figure 6A:
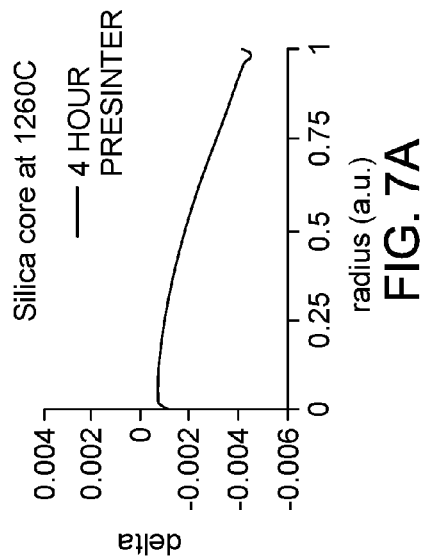
Figure 6B:
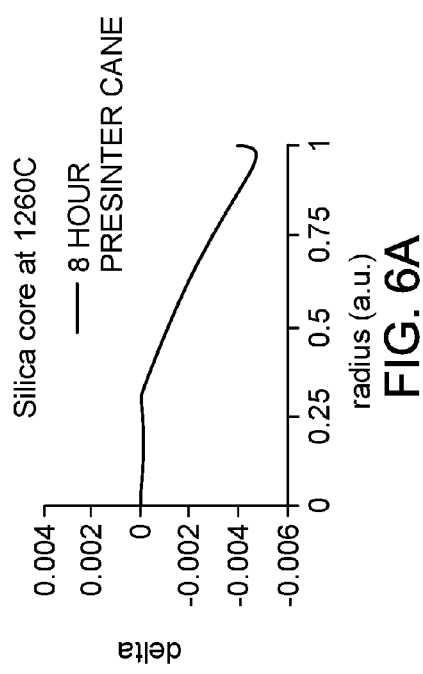

FIGS. 6A and 6B illustrate refractive index profiles of several embodiments of exemplary preforms 100D obtained with above processing method(s). In these figures, the vertical axis corresponds to the sintered preform's relative refractive index delta, which is calculated relative to that of pure silica (pure silica has a relative refractive index delta of 0); and the horizontal axis corresponds to the normalized radius of preform 100D (i.e., r=1 corresponds to the outer radius of the preform 100D, this would correspond to the outer edge of the trench, $r_3$ in the resultant fiber). FIG. 6A illustrates the doped fluorine profile of the preform 100D that was made starting with a soot preform 100A comprised essentially of silica. It illustrates that the trench portion of the preform corresponds to the normalized radii of 0.33≤r≤1 (where r=11 on the outer surface of the preform), that the maximum relative refractive index depression (Δ=−0.5%) was obtained on the outside of the F doped preform 100D (i.e., at r=1), with the amount of doped fluorine concentration decreasing almost linearly with the decreasing radial distance from the outside of the preform towards the preform center, and thus an almost linear transition in refractive index delta from the normalized radius r=1 to the radius where $r=r_d$=0.33. This figure indicates that no significant amounts of fluorine is present (there is no corresponding index depression, relative to pure silica) in the inner 33% (radial distance) of the preform 100D. The final optical fiber preform 100 is formed by applying the outer clad layer to the preform 100D. This can be done, for example, by depositing pure silica or silica doped with other dopants via the OVD process and subsequent consolidation, or by inserting the optical preform 100D into a silica based tube and inserting this assembly into a furnace to adhere the tube to the preform 100D. FIG. 6B illustrates refractive index profile as a function of normalized radial position for preform 100D, when the starting preform 100A is a silica preform with a germania doped core that extends to normalized radial position 0.33 (and pure silica from the radial position of 0.33 to 1, before F-doping). The pre-densification, fluorine doping and sintering conditions are similar to conditions outlined above for silica preform illustrated in FIG. 6A.

Figure 8:
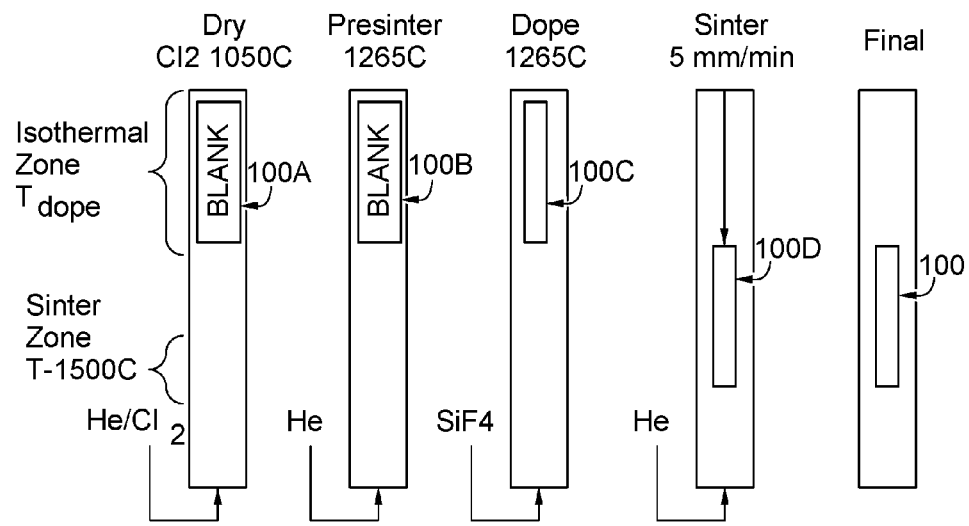
FIG. 8 illustrates schematically one embodiment of optical preform making method.

FIGS. 8- and 9 illustrate schematically two embodiments of optical preform making methods that include the steps of preheat, F doping at temperatures below 1290° C., and sintering, that result in profiles having a low index trench with lower concentration of doped fluorine on the inner portion of the doped preform and higher amount of fluorine on and/or near the outside portion of the doped preform FIG. 8 illustrates one embodiment of a process for obtaining non-uniform fluorine doped profile. According to this embodiment, a soot preform 100A is loaded into a furnace, pre-heated, and treated with a dehydration agent ($Cl_2$) at a temperature of around 1050° C. After the dehydration step, the temperature of the furnace is increased to 1265° C., where the preform under-goes the pre-densification step until its average soot density has increased to a target density (e.g., 8 hrs in a furnace at 1265° C.). The preform 100B is then doped with fluorine by exposing it to a fluorine precursor (for example, $SiF_4$) at the doping temperature Tj of 1265° C. for at least 30 minutes, and then the preform is sintered to full density glass preform 100D by downdriving the F-doped preform 100C through a hot zone having peak temperature of 1500° C. at a downdrive speed of 5 mm/min (corresponding to heating rate of 2.5° C./min)

Figure 7A:
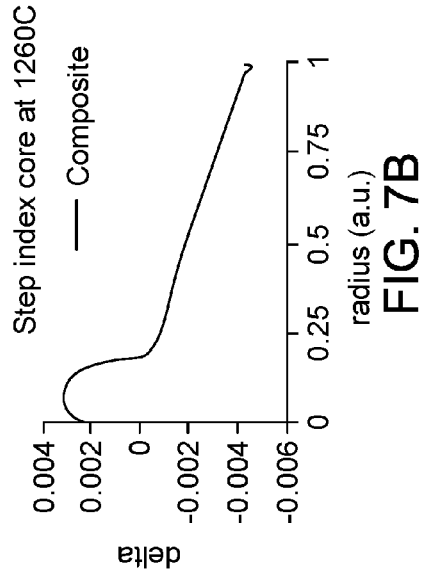
FIGS. 6A, 6B, 7A, and 7B illustrate several refractive index profiles of exemplary embodiments of the optical fiber preforms.
Figure 7B:
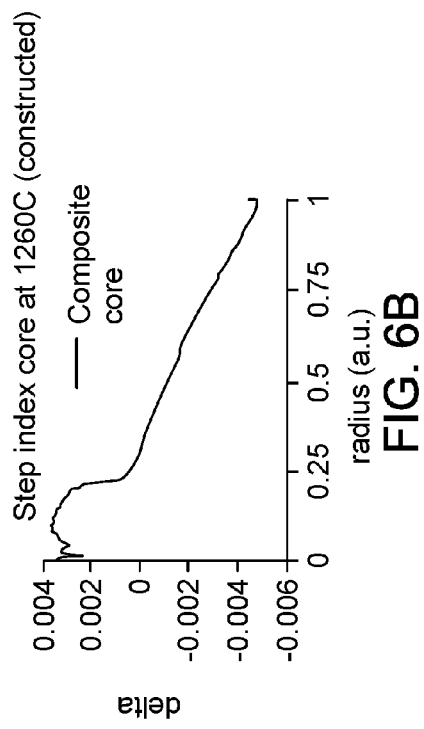

According to another exemplary embodiment, we utilized a similar recipe to make a preform 100A that was used to as a initial preform that resulted in the preform of FIG. 6A (i.e., preform 100A comprised of silica, with no Ge), and a similar processing method for F-doping, but in this embodiment used pre-densification time of 4 hrs (instead of 8 hrs) at 1265° C. The resultant refractive index profile (almost an alpha profile) of the preform 100D is shown in FIG. 7A. It is estimated that the density on the outside of the preform 100B in this embodiment was about 0.81 g/cm³ and 0.75 g/cm³ on the inside of the preform. The final optical fiber preform 100 is formed by applying the outer clad layer to the preform 100D. FIG. 7B illustrates refractive index profile of another preform as a function of normalized radial position for preform 100D. In FIG. 7B embodiment the starting preform 100A is a silica preform with a germania doped core that extends to normalized radial position 0.33 (and pure silica from the radial position of 0.33 to 1, before F-doping). The pre-densification, fluorine doping and sintering conditions are similar to conditions outlined above for silica preform illustrated in FIG. 7A.

Thus, we discovered that the pre-sintered soot density of the preform 100B can be used as a parameter to restrict the diffusion of the gas phase fluorine compounds, and thus, in turn, helps to define or control the desired refractive index profile shapes in the resulting preform 100D. Similar processing of a preform 100A having a germania doped core extending to normalized radial position of 0.25 resulted in the preform shown in FIG. 7B. According to some embodiments, the pre-densification or pre-sintering step to make the preform 100B is performed by rapidly moving a preform 100A through the hot zone (e.g., 1490° C.) in a down-drive furnace one or more times at a fast rate—i.e., greater than 25 mm/min (which corresponds to a heating rate of >12.5° C./sec). An exemplary process is illustrated schematically in FIG. 9. Typical down-drive rate suitable for the densification step (also refer to herein as pre-sinter) is 25 mm/min to 100 mm/min, for example 25 mm/min to 50 mm/min. This method is useful for creating a preform density profile that is preferentially densified (i.e., more densified) near the outside of the preform 100B, which is suitable for example for making preforms that could be used to draw the fibers illustrated in FIG. 5. When the pre-densified preform with preferential higher density on the outside of the preform is exposed to fluorine precursor at temperatures $T_{dope}$ below 1290° C., this results in F diffusion that is significantly lower in the outside region of the preform resulting in F doping profile that is non-uniform, with doped fluorine concentration that is significantly higher on the outside of the preform compared to the inside of the preform. The concentration of F on the inside of the preform 100D is less than 0.4 of the fluorine concentration on the outside of the preform. Typical temperatures used for pre-densification via pre-sintering are 1450° C. to 1520° C. and the down-drive rate is typically 25 mm/min to 50 mm/min.

In some embodiments one of the following methods is used to achieve higher preform densities in order to create a pre-densified preform 100B:

(i) Pressing of silica based soot (or pure silica soot) is used as a method to obtain preform densities greater than 0.8 g/cm$^3$, more preferably greater than 0.9 g/cm$^3$ and even more preferably greater than 1 g/cm$^3$ Preferably the preform average soot density is less than 1.8 g/cm$^3$, more preferably less than 1.7 g/cm$^3$, and even more preferably less than 1.6 g/cm$^3$, to provide enough porosity to allow the fluorine (from the next step) to penetrate from outside through the pores for the desired distance towards the inner region of the preform;

(ii) Combination of higher laydown densities followed by some amount of pre-densification during sintering step. This is attractive as it can significantly shorten the pre-densification time and hence reduce manufacturing cost.

Figure 10:
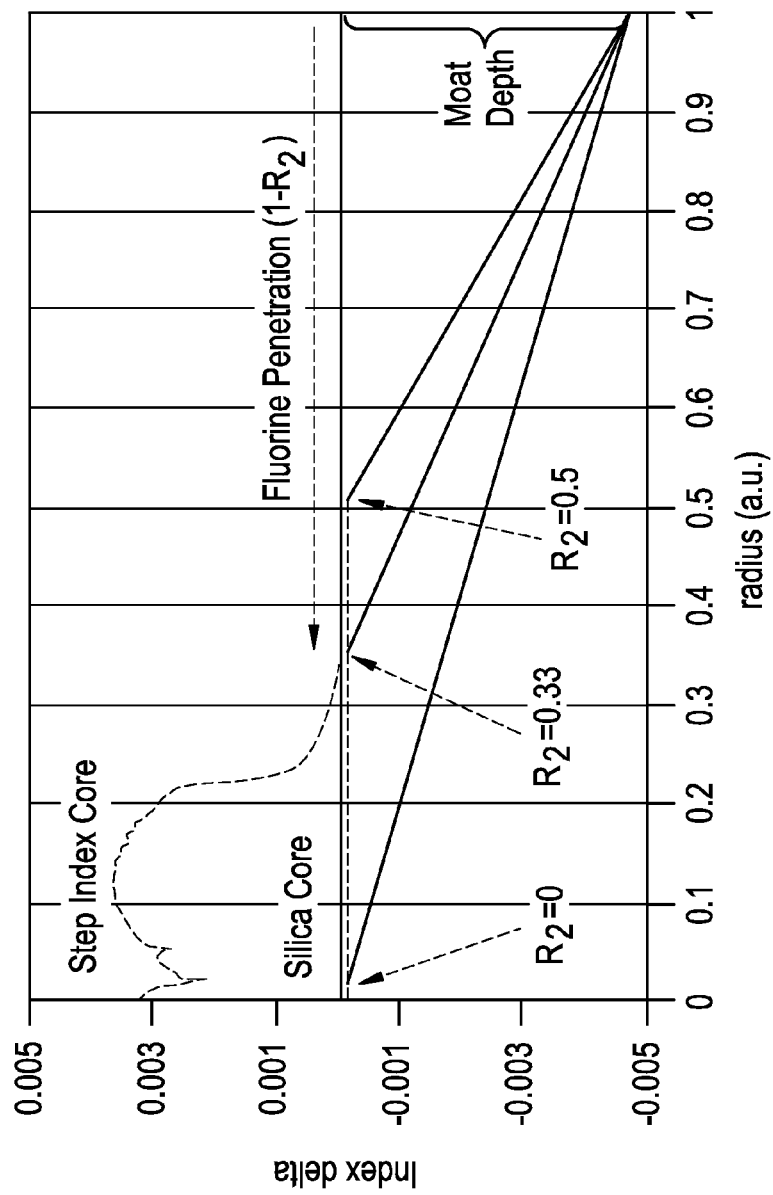
FIG. 10 illustrates fluorine penetration, $r_d$, for different penetration parameters A.

The shape of the fluorine profile (i.e, the concentration of F in different portions of the preform 100C), and thus the shape of the refractive index profile of the final sintered preform 100D can be determined by controlling and/or choosing, in combination, the partial pressure of the fluorine precursor during the F-doping step, the average preform density after the pre-densification step and preform diameter after the pre-densification step (e.g., after the pre-sinter step), and the fluorine doping temperature $T_{dope}$ (where $T_{dope}$<1295° C. and preferably ≤1290° C.). The relative refractive index profile of the preform can be characterized by a ramped fluorine concentration profile, and by how far the fluorine penetrates into the preform. It is useful to examine the profile in normalized radial space, where $r_3$ is normalized to a value of 1. That is, relative refractive index profile is characterized by defining a radial position $r_d$, in normalized radial space of the preform 100C or 100D, at which the fluorine concentration will become substantially zero (less than about 0.02% by weight in the silica) Thus $r_d$ also represents the maximum radial distance from the preform center where the fluorine dopant concentration is about zero. The radial position $r_d$ to which the concentration of fluorine declines from the maximum concentration at or near the outer surface to about zero percent is called the penetration (also referred to as penetration distance or penetration radius herein). When the fluorine concentration reaches substantially zero in a profile, then $r_d=r_2$ in the preform (which corresponds to $r_2$ in the resultant fiber). In some embodiments the fluorine penetration radius $r_d$ is 0.5 or less (where normalized radius r is 1 at the outer surface of the preform 100C or 100D). For example in some embodiments the fluorine penetration radius $r_d$ is 0.49, 0.45 or 0.4; and in others at 0.33 or less (e.g., 0.3, 0.25, 0.22, 0.20, 0.15, 0.1, 0.02), in others 0. For example, an $r_d=0.25$ corresponds to fluorine penetrating only the outer 75% of the preform 100D. In some embodiments the fluorine penetration radius $r_d$ is 0.75 or less. In other exemplary embodiments the fluorine may penetrate to the center of the blank to provide doping such that the ratio of the concentration of fluorine on the inside of the preform to concentration of fluorine on the outside of the preform is less than 0.4. In the embodiment of FIG. 7A the amount of F at the center of preform 100D is about 25% of the F concentration at the outer surface of the preform The relative refractive index profiles for some of these embodiments of optical preform 100D are shown in the FIG. 10. More specifically, FIG. 10 represents several embodiments with the respective values of $r_d=0.5$, 0.33 and 0, corresponding to the fraction of the preform that is situated on the inside of the preform where there is no F penetration i-e no further doping of fluorine. The F-penetration radii $R_d$ of 0.5, 0.33 and 0, correspond to the penetration parameters $A_1$, $A_2$, and $A_3$, respectively, where $A_1>A_2>A_3$. It is noted that the preform 100D can contain Ge doped core region(s), as shown for example but the dashed curve $\Delta_{1Max}$ of 0.003 (corresponding to $\Delta_{1Max}\%$ of 0.3%), or, may include silica doped with other dopants, or may be made entirely of silica (the dashed line corresponding to $\Delta_{1Max}=0$. The trench shape defined by the F doping step may provide specific desired trench volume through control of the maximum trench depth (preform trench depth, or the minimum refractive index delta relative to pure silica) and fluorine penetration (i.e., the value of $r_d$). For example, the F precursor concentration and the density of the preform 100B determined the maximum index depression, corresponding to $\Delta_{3MIN}=-0.0043$ (corresponding to $\Delta_{3Min}\%$ of −0.43%). One of the embodiments of the preform 100D illustrated in FIG. 10 has a Ge doped core, a silica inner cladding and a trench defined by fluorine penetration radius $r_d$ of 0.5. Another embodiment of the preform 100D illustrated in FIG. 10 has a Ge doped core, no inner cladding, and a trench defined fluorine penetration $r_d$ of 0.33. Another embodiment of the preform 100D schematically illustrated in FIG. 10 has a pure silica core, no inner cladding, and a trench defined by fluorine penetration $r_d$ of 0.5. Another embodiment of the preform 100D schematically illustrated in FIG. 10 has a pure silica core, no inner cladding, and a trench defined by fluorine penetration $r_d$ of 0.33. Yet another embodiment of the preform 100D schematically illustrated in FIG. 10 has a refractive index delta profile defined by fluorine penetration $r_d=0$. This embodiment started as a pure silica soot preform 100A, but in this embodiment, during the F-doping step, fluorine penetrated to the very center of the preform.

The trench profile shape of the optical preform may be determined using several empirical relations between the process parameters. First the maximum trench depth of the preform, $\Delta_{3min}$, (which will be the same as $\Delta_{3min}$ in the resulting fiber) is established as the equilibrium between the fluorine dopant and silica soot. The equilibrium doping level in silica with F (the amount of F in wt %, or "wt % F"), at a given partial pressure of F precursor, can be easily calculated. For example, is wt % F=B*P$^{1/4}$, where P is the partial pressure of the F precursor, and B is a coefficient where 0<B<1. The amount of wt % F, in turn, determines the maximum depth of the trench, or the $\Delta_{3min}$.

For example, in the embodiment using SiF$_4$ in a surrounding (He) gas phase wt % F=0.0233*P(SiF$_4$) 1/4, and $\Delta_{3min}=-0.31$*wt % F. In FIG. 10, the trench depth is fixed at $\Delta \%=-0.43\%$, which corresponds to a F concentration in silica glass of 1.4 wt % F, and is achieved with a 13% dopant concentration. At a fixed (given) maximum trench depth (i.e., the most negative refractive index delta, or $\Delta_{3MIN}$), the F concentration in the trench portion of the preform 100D and thus the trench profile (refractive index profile of the preform region corresponding to the trench of fiber 10) is further defined by the fluorine penetration—i.e., the value $r_d$. The slope of the line (i.e., the slope of the trench's refractive index profile $\Delta_{3min}/(1-r_d)$) in normalized radial space of the preform, extending from the location of maximum trench depth to the penetration distance rd, is related to function A (also referred to as a penetration parameter herein), which in turn depends on the F doping temperature $T_{dope}$, the densified preform's radius R, and the density of the preform 100B. For example, the value of function A for a preform 100B with an average a soot density $\rho_{ave}$ is given by Equation 1, above.

As stated earlier, to achieve a specific profile, each of the process parameters $T_{dope}$, concentration of the fluorine precursor such as [SiF$_4$] for example, outer radius R of the predensified preform, and the preform density $\rho_{ave}$ must be cooperatively controlled and/or chosen. Also as stated, it is preferable to minimize the doping temperature $T_{dope}$ in order to minimize internal stress in the blank, so that $T_{dope} \leq 1290°$ C., and more preferably $T_{dope} \leq 1275°$ C. The temperature limitation necessarily constrains the choices of the other parameters. The concentration of fluorine precursor such as SiF$_4$ in the doping gas is generally fixed in the process, as it determines the maximum trench depth. We recognized that to develop the desired refractive index profiles, and to achieve low doping temperatures as a means of reducing internal stresses in a preform, higher density preforms than that what can typically be made by direct OVD methods would be advantageous. Table 1 discloses examples of predensified preform's outer radii R (in cm), preform's density after the pre-densification step, and doping temperatures for achieving non-uniform preform doping profile when fluorine doping is performed in an environment of SiF$_4$/He mixture, with the SiF$_4$ partial pressure of 0.13 atm.

We discovered that during exposure to a particular fluorine dopant concentration, that an inter-relationship exists between the doping temperature, the blank radius and the blank density enabling the same profile to be achieved when the A parameter (see for example, Eq. 1, above) is held constant for different values of $T_{dope}$, (in degrees Kelvin, the furnace temperature at which the fluorine precursor (SiF$_4$) and the blank are contacted), R (the blank radius in cm after pre-treatment at the start of the doping process), and $\rho_{in}$ (the average blank density in g/cc after pre-treatment at the start of the doping process). Thus, when in two cases of doping, where the R, $\rho_{in}$ and $T_{dope}$ are adjusted to provide the same A value the blanks will retain the same moat shape in normalized radial space.

With respect to control of the fluorine doping profile, it is desirable to relate a moat shape to the A parameter value, so that possible to empirically a relationship between the slope of the trench in a profile to the A. The slope of the trench in the fiber can be defined as $(r_3-r_2)/(\Delta_{3min}-\Delta_2)$ and thus the corresponding slope in the preform 100D is $(R-r_d)/(\Delta_{3min}-\Delta_2)$.

In the exemplary embodiment(s), the dopant gas was SiF$_4$, concentration of SiF$_4$ was held at 13% during the F-doping step, and total flow rates were fixed at about 10 slpm, with a furnace muffle diameter of 7 inches, we empirically determined that $A=0.275*e^{(-3.1*slope)}$. Penetration depth of the moat could then be calculated from the index slope. The empirical nature of the relationship results from the several parameters that could vary from one process environment to another. To further illustrate the directive utility of the A parameter in controlling this process, Table 1 shows a series of preforms of specified density and radius with the appropriate doping temperature to achieve constant A parameter profiles corresponding to $r_d$ values of 0, 0.33 and 0.5.

TABLE 1

| Example # | Preform Radius after Pre-Densification Step (cm) | Density after Pre-Densification Step (g/cc) | Doping Temperature $T_{dope}$ (° C.) | Parameter A | Penetration, $r_d$ |
|---|---|---|---|---|---|
| Examples where F doped profile penetrates to normalized radius = rd = 0 ||||||
| 1 | 1.1 | 1.6 | 1290 | 1.05 | 0.00 |
| 2 | 1.7 | 1.3 | 1290 | 1.05 | 0.01 |
| 3 | 2.3 | 1.1 | 1290 | 1.05 | 0.00 |
| 4 | 3.1 | 0.9 | 1290 | 1.05 | 0.00 |
| 5 | 4.0 | 0.9 | 1265 | 0.989 | −0.04 |
| 6 | 4.8 | 1.1 | 1229 | 1.05 | 0.00 |
| 7 | 5.3 | 0.9 | 1243.5 | 1.04 | 0.00 |
| 8 | 5.6 | 0.8 | 1250 | 1.04 | 0.00 |
| 9 | 6.0 | 0.7 | 1256 | 1.04 | 0.00 |
| Examples where F doped profile penetrates to normalized radius $r_d$ = 0.34 ||||||
| 10 | 1.6 | 1.6 | 1290 | 2.14 | 0.34 |
| 11 | 2.5 | 1.3 | 1290 | 2.19 | 0.35 |
| 12 | 3.3 | 1.1 | 1290 | 2.16 | 0.34 |
| 13 | 3.3 | 1.3 | 1265 | 2.10 | 0.33 |
| 14 | 3.0 | 1.6 | 1239 | 2.11 | 0.33 |
| 15 | 4.8 | 1.1 | 1258 | 2.13 | 0.34 |
| 16 | 5.3 | 0.9 | 1274 | 2.18 | 0.34 |
| 17 | 5.6 | 0.8 | 1280 | 2.13 | 0.34 |
| 18 | 6.0 | 0.7 | 1286 | 2.12 | 0.34 |
| Examples where F doped profile penetrates to normalized radius $r_d$ = 0.49 ||||||
| 19 | 2.2 | 1.6 | 1290 | 3.97 | 0.49 |
| 20 | 3.4 | 1.3 | 1290 | 3.96 | 0.49 |
| 21 | 4.5 | 1.1 | 1290 | 3.92 | 0.49 |
| 22 | 3.6 | 1.1 | 1290 | 2.55 | 0.39 |
| 23 | 3.4 | 1.3 | 1290 | 3.96 | 0.49 |
| 24 | 3.0 | 1.6 | 1265 | 3.97 | 0.49 |
| 25 | 4.8 | 1.1 | 1285 | 4.04 | 0.49 |
| 26 | 5.0 | 1 | 1290 | 3.77 | 0.48 |

Examples 1-26 of Table 1 show that for a wide range of preform sizes, preforms 100D with profiles indicating different fluorine penetration can be achieved by fluorine doping of pre-densified preform 100B at temperatures below 1295° C. and even at or below 1290° C., for example within the temperature range of 1225° C. to 1290° C. These examples show how an empirical understanding of the depth of penetration of the moat for combinations of blank dimensions and the doping temperature enable a process that avoids the blank failure conditions that can occur when doping is conducted at temperatures higher than 1300 C. Similar relationships can be developed for different process conditions, such as for different [SiF$_4$], or different flow rates, or for different process equipment. While the slope relationships differ at varying levels of [SiF$_4$](partial pressure of SiF$_4$) due to the resulting variation in $\Delta_{3min}$, preferable ranges of the magnitude of parameter A, with doping temperature between 1230° C. and 1290° C., is less than 5. In some embodiments the magnitude of parameter A is less than 2.5 and even in some other embodiments is less than 1.5. Preferably, the magnitude of the parameter is A is larger than 0.5, in some embodiments is larger than 1 and in some other embodiments larger than 1.25. Examples 1-26 of Table 1 also show that for preform sizes of practical interest, preforms 100D with profiles indicating different fluorine penetration can be achieved by fluorine doping of pre-densified preform 100B at temperatures below 1295° C. and even at or below 1290° C., for example within the temperature range of 1225° C. to 1290° C.

With reference to fibers 10 of FIGS. 1A and 1B, the optical preforms for these fibers are made by utilizing germania doped silica soot (this region of the preform 100A will correspond to the core region of the fiber 10), surrounding this layer of germania doped silica based soot with a pure silica layer, pre-densifying the resultant preform 100A by one of the methods described above, and then fluorine doping the resultant predensified preform 100B at temperature(s) below 1295° C., and preferably not greater than 1290° C., to create a trench. The F-doped preform 100C is consolidated and overclad to produce the preform 100D. An overclad layer is then applied to preform 100D to make final preform 100 from which the embodiments for optical fibers of FIGS. 1A and 1B can then be drawn. In this fiber embodiment of the optical preform 100 the fluorine penetration does not extend all the way to the updoped region, thus the F-doped preform includes a core region, an inner cladding region (i.e., pure silica region) and the trench. In these embodiments of the optical fiber preform fluorine penetration $r_d$ corresponds to the radius $r_2$ in FIGS. 1A and 1B. Optical fiber shown in FIG. 5 can be made using a similar process outlined above, however the radial density profile in the preform 100A is tailored such that the doped fluorine profile results in the convex refractive index profile shown in FIG. 5.

With reference to fibers 10 of FIG. 2, the optical preforms for FIG. 2 fiber are made by a similar method. However, a high density barrier layer is put at radial location corresponding to radial position $r_2$ that stops penetration of fluorine beyond that location during the fluorine doping process (at temperatures below 1295° C., and preferably not greater than 1290° C.) and results in a trapezoidal trench shaped of the trench refractive index profile. The F-doped preform 100C is consolidated and overclad applied to produce the final preform 100 from which the embodiments for optical fibers of FIG. 2 can then be drawn. In this fiber embodiment of the optical preform 100 the fluorine penetration does not extend all the way through the pure silica region to the updoped region, thus the F-doped preform includes a core region, an inner cladding region (i.e., pure silica region) and the trench.

Alternatively, the optical preforms 100A for FIG. 2 fiber are by made by utilizing germania doped silica soot (this region of the preform 100A corresponds to the core region of the fiber 10), surrounding this layer of updoped silica based soot with another layer of updoped soot that results in a lower refractive index delta than that of the central core region pure silica layer (this region of the preform 100A will correspond to the inner core region of the fiber 10), and then surrounding this layer of updoped silica based soot with a pure silica layer. The resultant preform 100A is predensified by one of the methods described above, and then the predensified preform 100B is fluorine doped at a temperature of 1290° C. to create a trench. The F-doped preform 100C is consolidated and overclad to produce the final preform 100 from which the embodiments for optical fibers of FIGS. 1A and 1B can then be drawn. In this fiber embodiment of the optical preform 100 the fluorine penetration does not extend all the way to the germania doped region region, thus the F-doped preform includes a core region, an inner cladding region (i.e., pure silica region) and the trench. In these embodiments of the optical fiber preform fluorine penetration radius $r_d$ corresponds to the radius $r_2$ in the optical fiber profile of FIG. 2.

The optical preforms for fibers FIG. 3 are made by utilizing germania doped silica soot (this region of the preform 100A will correspond to the core region of the fiber 10), surrounding this layer of updoped silica based soot with a pure silica layer, pre-densifying the resultant preform 100A by one of the methods described above, and then fluorine doping the resultant predensified preform 100B at temperatures below 1295° C., and preferably not greater than 1290° C. to create a trench. The F-doped preform 100C is consolidated and then overclad twice—once with F or B doped silica, and second time with a layer that has a higher index of refraction, to produce the final preform 100 from which the embodiments for optical fibers of FIG. 3 can then be drawn. In this fiber embodiment of the optical preform 100 the fluorine penetration also does not extend all the way through the pure silica region to the updoped region, thus the F-doped preform includes a core region, an inner cladding region (i.e., pure silica region) and the trench. In this embodiment of the optical fiber preform fluorine penetration rd corresponds to the radius r2 in FIG. 3.

The optical preforms for fibers FIG. 4 are made by utilizing updoped silica soot (this region of the preform 100A will correspond to the core region of the fiber 10), surrounding this layer of updoped silica based soot with a pure silica layer, pre-densifying the resultant preform 100A by one of the methods described above, and then fluorine doping the resultant predensified preform 100B at temperatures below 1295° C., and preferably not greater than 1290° C. to create a trench. The F-doped preform 100C is consolidated and then overclad to produce the final preform 100 from which the embodiments for optical fibers of FIG. 4 can then be drawn. In this fiber embodiment of the optical preform 100 the fluorine penetration also extends all the way through the pure silica region to the updoped region, thus the F-doped preform includes a core region, no inner cladding region (i.e., pure silica region) and a trench. In this embodiment of the optical fiber preform the fluorine penetration radius $r_d$ corresponds to the radius $r_1$ in FIG. 4.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

Thus, according to some embodiments, q method of making an optical fiber preform comprises in order:
(i) manufacturing a glass preform with at least one porous layer;
(ii) pre-densifying said preform thereby increasing average glass density of said porous glass layer to at least 0.7 g/cm$^3$ but less than 1.9 g/cm$^3$ to make a pre-densified preform;
(iii) exposing the pre-densified preform to fluorine precursor at temperature below 1290° C. to make a pre-densified fluorine treated preform,
exposing the pre-densified fluorine treated preform the temperatures above 1400° C. to completely sinter the preform; and obtaining a fluorine doping profile where the ratio of the concentration of fluorine on the inside of the preform to concentration of fluorine on the outside of the preform is less than 0.4. In some embodiments the fluorine precursor is $SiF_4$ According to some embodiments the average glass density of the porous glass layer is increased to least 0.75 g/cm$^3$ but less than 1.6 g/cm$^3$, the pre-densified preform is exposed to fluorine precursor at temperature of 1290° C. or less, and sintering of the fluorine treated preform is performed at the temperatures above 1450° C. to completely sinter the preform.

Preferably, said pre-densified preform is exposed to fluorine precursor at temperature of 1290° C. or less, such that the outer surface of pre-densified preform reaches a closed pore state. In some embodiments the pre-densified preform is exposed to fluorine precursor at temperature of 1290° C. or less, for 10 minutes to 2 hours Preferably, the concentration of fluorine on the inside of the preform to concentration of fluorine on the outside of the preform is less than 0.2, more preferably less than 0.1. Preferably, the preform parameter $r_d$ is larger than 0, where $r_d$ represents fraction of preform in radial space that is substantially free of doped fluorine. For example, in some embodiments, preform parameter $r_d$ is larger than 0.25, and in some embodiments is less than 0.75.

In at least some embodiments, the pre-densified preform is F doped at a doping $T_{dope}$, such that penetration parameter A is between 0.5 and 5, wherein A is defined as $A=10^{12}*R^2*T_{dope}^{1/2}(e^{-55750/T_{dope}})/(6.6*e^{(-2.81*\rho ave)}*[SiF4]^{3/4})$, where R as the radius of the pre-densified preform in cm, $T_{dope}$ is the doping temperature in K, $\rho_{ave}$ is the average density of the pre-densified preform and $[SiF_4]$ is the partial pressure of $SiF_4$ dopant in atm.

Preferably the pre-densified preform is exposed to fluorine precursor at doping temperature of between 1225° C. and 1290° C.

According to at least some embodiments, a method of making an optical fiber preform comprises the steps of: (i) manufacturing a glass preform with at least one porous glass layer having glass density below 0.65 g/cm$^3$; (ii) pre-densifying said glass preform by partially consolidating the glass preform from a deposited density to a pre-densified density such that a resulting average glass density of said porous glass layer is an intermediate density ρin; (iii) exposing the pre-densified preform to fluorine precursor at temperature below 1290° C., where the temperature T is chosen such that: $5\times10^{13}*[SiF_4]^{3/4}*6.5949e^{(-2.8063\rho ave)}R^2 \leq T_{dope}^{1/2}e^{(-55750/T)} \leq 5\times10^{-12}*[SiF_4]^{3/4}*6.5949e^{(-2.8063\rho ave)}/R^2$, (iv) exposing the pre-densified fluorine treated preform to temperatures above 1400° C. to completely sinter the preform, and (v) obtaining a fluorine doping profile where the ratio of the concentration of fluorine on the inside of the preform to concentration of fluorine on the outside of the preform is less than 0.4. Preferably, the concentration of fluorine on the inside of the preform to concentration of fluorine on the outside of the preform is less than 0.2, for example less them 01, and/or the preform parameter $r_d$>0.25.

What is claimed is:

1. A method of making an optical fiber preform, the method comprising:
   manufacturing a glass preform with at least one porous layer;
   pre-densifying the glass preform comprising increasing an average density of the at least one porous layer such that the at least one porous layer has an average density of at least 0.7 g/cm$^3$ but less than 1.9 g/cm$^3$, thereby forming a pre-densified preform;
   exposing the pre-densified preform to a fluorine precursor in a furnace having a doping temperature of 1290° C. or less to make a pre-densified fluorine doped preform; and
   exposing the pre-densified fluorine doped preform to a zone of the furnace, the zone having a second temperature greater than 1400° C., to completely sinter the pre-densified fluorine doped preform resulting in a fluorine doped sintered preform having a fluorine doping profile such that a ratio of a concentration of fluorine in an inner cladding region inside a trench of the fluorine doped sintered preform to a concentration of fluorine in an outermost cladding region outside the trench of the fluorine doped sintered preform is less than 0.4.

2. A method of making an optical fiber preform, the method comprising:
   manufacturing a glass preform with at least one porous layer;
   pre-densifying the glass preform comprising increasing an average density of the at least one porous layer such that the at least one porous layer has an average density of at least 0.7 g/cm$^3$ but less than 1.9 g/cm$^3$, thereby forming a pre-densified preform;
   exposing the pre-densified preform to a fluorine precursor in a furnace having a doping temperature of 1290° C. or less to make a pre-densified fluorine doped preform having a maximum concentration of fluorine in a maximum concentration region at or adjacent to an outmost region of the pre-densified fluorine doped preform; and
   exposing the pre-densified fluorine doped preform to a zone of the furnace, the zone having a second temperature greater than 1400° to completely sinter the fluorine doped preform, resulting in a fluorine doped sintered preform having a doping profile such that a ratio of a concentration of fluorine in an inner cladding region inside a trench of the fluorine doped sintered preform to a concentration of fluorine in the maximum concentration region is less than 0.4, and the inner cladding region is situated closer to a preform center than the maximum concentration region.

3. The method of claim 1, wherein:
pre-densifying the preform comprises increasing the average density of the at least one porous layer to least 0.75 g/cm$^3$ but less than 1.6 g/cm$^3$, and
the second temperature of the zone of the furnace is greater than 1450° C.

4. The method of claim 1, wherein exposing the pre-densified preform comprises exposing the pre-densified preform to the fluorine precursor for a time sufficient such that the outermost cladding region of the pre-densified fluorine doped preform reaches a closed pore state.

5. The method of claim 1, wherein the ratio is less than 0.2.

6. The method of claim 1, wherein a preform parameter $r_d$ is larger than 0, wherein the preform parameter $r_d$ represents a fraction of preform in radial space that is substantially free of doped fluorine, and a maximum fluorine concentration corresponds to a normalized radius r, wherein r=1.

7. The method of claim 1, wherein a preform parameter $r_d$ is:
larger than 0.25; and
less than 0.75,
wherein the preform parameter $r_d$ represents a fraction of preform in radial space that is substantially free of doped fluorine, and a maximum fluorine concentration corresponds to a normalized radius r, wherein r=1.

8. The method of claim 1, wherein the fluorine precursor is $SiF_4$.

9. The method of claim 1, wherein a penetration parameter A is between 0.5 and 5, the penetration parameter A is $$A = 10^{12} * R^2 * T_{dope}^{1/2} (e^{-55750/Tdope}) / (6.6 * e^{(-2-0.81\rho_{ave})} * [SiF_4]^{3/4}),$$

wherein R is a radius of the pre-densified preform in cm, $T_{dope}$ is the doping temperature in K, $\rho_{ave}$ is an average density of the at least one porous layer, and $[SiF_4]$ is a partial pressure of an $SiF_4$ dopant in ATM.

10. The method of claim 1, wherein the doping temperature is between 1225° C. and 1290° C.

11. A method of making an optical fiber preform, the method comprising:
manufacturing a glass preform with at least one porous glass layer having a glass density less than 0.65 g/cm$^3$;
pre-densifying the glass preform comprising partially consolidating the preform from a deposited density to a pre-densified density such that the at least one porous glass layer has an average glass density that is an intermediate density $\rho_{in}$, thereby forming a pre-densified preform;
exposing the pre-densified preform to a fluorine precursor in a furnace having a doping temperature T, where T<1290° C., to form a pre-densified fluorine doped preform, wherein the doping temperature T is selected such that $$5 \times 10^{-13} \times 6.5949 e^{(-2.8063\rho_{ave})}/R^2 \leq T_{dope}^{1/2} e^{(-55750/T)} \leq 5 \times 10^{12} \times 6.5949 e^{(-2.8063\rho_{ave})}/R^2,$$

where R is an outer radius of the pre-densified fluorine doped preform in cm, $T_{dope}$ is the doping temperature in K, and $\rho_{ave}$ is the average glass density;
exposing the pre-densified fluorine doped preform to a zone of the furnace, the zone having a second temperature greater than 1400° C., to completely sinter the pre-densified fluorine doped preform, resulting in a fluorine doped sintered preform having a fluorine doping profile such that a ratio of a concentration of fluorine in an inner cladding region inside a trench of the fluorine doped sintered preform to a concentration of fluorine in an outermost cladding region outside the trench of the fluorine doped sintered preform is less than 0.4.

12. The method of claim 11, wherein the ratio is less than 0.2.

13. The method of claim 11, wherein a preform parameter $r_d$ is larger than 0, wherein the preform parameter $r_d$ represents a fraction of preform in radial space that is substantially free of doped fluorine, and a maximum fluorine concentration corresponds to a normalized radius r, wherein r=1.

14. The method of claim 13, wherein a preform parameter $r_d$ is larger than 0.25 and less than 0.75.

15. A method of making an optical fiber preform, the method comprising:
manufacturing a substrate with at least one porous glass layer having an average glass density less than 0.65 g/cm$^3$;
pressing a second porous glass layer onto the substrate such that the average glass density of the substrate with the pressed porous glass layer is at least 0.8 g/cm$^3$ but less than 1.6/cm$^3$, thereby forming a pre-densified preform with a pressed porous glass layer;
exposing the pre-densified preform with the pressed porous glass layer from an outside to a fluorine precursor at a doping temperature less than 1290° C., thereby forming a pre-densified fluorine doped preform;
exposing the pre-densified fluorine doped preform to a furnace having a second temperature above 1450° C. to completely sinter the pre-densified fluorine doped preform, thereby forming a fluorine doped sintered preform having a fluorine doping such that a ratio of a concentration of fluorine on an inner cladding region inside a trench of the pre-densified fluorine doped preform to a concentration of fluorine in an outermost cladding region outside the trench of the pre-densified fluorine doped preform is less than 0.4.

16. The method of claim 15, wherein the ratio is less than 0.2.

17. The method of claim 16, wherein a preform parameter $r_d$ is larger than 0, wherein $r_d$ represents a fraction of preform in radial space that is substantially free of doped fluorine.

18. The method of claim 17, wherein the preform parameter $r_d$ is larger than 0.25, wherein a maximum fluorine concentration corresponds to a normalized radius r, wherein r=1.

19. The method of claim 17, wherein the preform parameter $r_d$ is less than 0.75, wherein a maximum fluorine concentration corresponds to a normalized radius r, wherein r=1.

20. A method of making an optical fiber preform, the method comprising:
manufacturing a glass preform with at least one porous layer;
exposing an outer most surface of the glass preform to a fluorine precursor in a furnace having a doping temperature less than 1295° C. to make a fluorine treated preform,
exposing the fluorine treated preform to a zone of the furnace, the zone having a second temperature greater than 1400° C., to completely sinter the fluorine treated preform; and
obtaining a fluorine doping profile where a ratio of a concentration of fluorine in an inner cladding region inside a trench of the fluorine treated preform to a concentration of fluorine in an outermost cladding region outside the trench of the fluorine treated preform is less than 0.4 and a maximum fluorine concentration corresponds to a normalized radius r, wherein r=1.

\* \* \* \* \*

UNITED STATES PATENT AND TRADEMARK OFFICE
CERTIFICATE OF CORRECTION

PATENT NO. : 9,975,802 B2
APPLICATION NO. : 14/278437
DATED : May 22, 2018
INVENTOR(S) : Steven Bruce Dawes et al.

It is certified that error appears in the above-identified patent and that said Letters Patent is hereby corrected as shown below:

In the Claims

Column 24, Line 59, Claim 2, delete "than 1400° to" and insert -- than 1400° C., to --, therefor.

Column 25, Line 31, Claim 9, delete "Tdope" and insert -- $T_{dope}$ --, therefor.

Column 25, Line 32, Claim 9, delete "ρave" and insert -- $\rho_{ave}$ --, therefor.

Column 25, Line 37, Claim 9, delete "an" and insert -- a --, therefor.

Column 25, Line 55, Claim 11, delete "ρave" and insert -- $\rho_{ave}$ --, therefor.

Column 25, Line 56, Claim 11, delete "5×10$^{12}$" and insert -- 5×10$^{-12}$ --, therefor.

Column 25, Line 56, Claim 11, delete "ρave" and insert -- $\rho_{ave}$ --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*